US012330990B2

(12) United States Patent
Akono

(10) Patent No.: US 12,330,990 B2
(45) Date of Patent: Jun. 17, 2025

(54) CEMENTS REINFORCED WITH GRAPHENE NANOPLATELETS OR HELICAL CARBON NANOTUBES

(71) Applicant: Northwestern University, Evanston, IL (US)

(72) Inventor: Ange-Therese Akono, Evanston, IL (US)

(73) Assignee: Northwestern University, Evanston, IL (US)

( * ) Notice: Subject to any disclaimer, the term of this patent is extended or adjusted under 35 U.S.C. 154(b) by 687 days.

(21) Appl. No.: 17/588,586

(22) Filed: Jan. 31, 2022

(65) Prior Publication Data

US 2022/0242787 A1 Aug. 4, 2022

Related U.S. Application Data

(60) Provisional application No. 63/144,347, filed on Feb. 1, 2021.

(51) Int. Cl.
*C04B 14/02* (2006.01)
*C04B 28/04* (2006.01)

(52) U.S. Cl.
CPC ............ *C04B 28/04* (2013.01); *C04B 14/026* (2013.01)

(58) Field of Classification Search
CPC ......... C04B 28/00; C04B 28/02; C04B 28/04; C04B 28/026; C04B 14/00; C04B 14/022; C04B 14/386; B82Y 30/00; B82Y 40/00
See application file for complete search history.

(56) References Cited

U.S. PATENT DOCUMENTS

| 7,041,167 | B2 | 5/2006 | Jiang |
| 8,865,107 | B2 | 10/2014 | Hersam et al. |
| 9,365,456 | B2 | 1/2016 | Shah et al. |
| 9,499,439 | B2 | 11/2016 | Shah et al. |
| 9,828,290 | B2 | 11/2017 | Christiansen et al. |
| 2015/0152314 | A1* | 6/2015 | Muthusamy ............ C04B 28/02 106/781 |
| 2019/0382269 | A1 | 12/2019 | Askari et al. |
| 2022/0017418 | A1 | 1/2022 | Akono et al. |
| 2023/0072824 | A1 | 3/2023 | Akono |

FOREIGN PATENT DOCUMENTS

| CN | 107382148 A | * 11/2017 |
| CN | 108863127 A | 11/2018 |
| PL | 236974 B1 | * 8/2019 |

(Continued)

OTHER PUBLICATIONS

Machine Translation of CN-107382148-A (Year: 2017).*

(Continued)

*Primary Examiner* — Smita S Patel
*Assistant Examiner* — Sarah Catherine Case
(74) *Attorney, Agent, or Firm* — BELL & MANNING, LLC

(57) ABSTRACT

Methods for the dispersion and synthesis of graphene nanoplatelet-cement composites and helical carbon nanotube composites with high concentrations of graphene nanoplatelets or helical carbon nanotubes that do not require chemical dispersion aids or dispersion-enhancing chemical surface functionalization are provided. Also provided are the reinforced cement composites made using the methods.

17 Claims, 19 Drawing Sheets

(56) References Cited

FOREIGN PATENT DOCUMENTS

| | | |
|---|---|---|
| WO | WO 2013/096990 A1 | 7/2013 |
| WO | WO 2020/092449 A1 | 5/2020 |

OTHER PUBLICATIONS

Machine Translation of PL-236974-B1 (Year: 2019).*
Cui et al., "Mechanical Properties and Reinforcing Mechanisms of Cementitious Composites with Different Types of Multiwalled Carbon Nanotubes" Composites: Part A, 103, pp. 131-147 (2017).*
The Non-Final Office Action issued on Mar. 23, 2023 for U.S. Appl. No. 17/376,426; pp. 1-36.
Maria del Carmen Camacho et al., "Mechanical Properties and Durability of CNT Cement Composites," Materials 2014, 7; pp. 1640-1651. Doi:10.3390/ma7031640.
C. Di Bella et al., "Application of microstructurally-designed mortars for studying early-age properties: Microstructure and mechanical properties," Cement and Concrete Research 78 (2015); pp. 234-244.
Maria S. Konsta-Gdoutos et al., "Self sensing carbon nanotube (CNT) and nanofiber (CNF) cementitious composites for real time damage assessment in smart structures," Cement & Concrete Composites 53 (2014); pp. 162-169.
Peter Stynoski et al., "Effects of silica additives on fracture properties of carbon nanotube and carbon fiber reinforced Portland cement mortar," Cement & Concrete Composites 55 (2015); pp. 232-240.
Matthieu Vandamme et al., "Nanogranular packing of C—S—H at substochiometric conditions," Cement & Concrete Research 40 (2010); pp. 14-26.
Qi Zhang et al., "Investigation of the structure of heated Portland cement paste by using various techniques," Construction and Building Materials 38 (2013); pp. 1040-1050.
G.Y. Li, P.M. Wang, X. Zhao, Mechanical behavior and microstructure of cement composites incorporating surface-treated multi-walled carbon nanotubes, Carbon N. Y. 43 (2005) 1239-1245. https://doi.org/10.1016/j.carbon.2004.12.017.
Xiao-Lin Xie et al., "Dispersion and alignment of carbon nanotubes in polymer matrix: a review," Materials Science and Engineering R 49 (2005); 89-112.
J.M. Makar, J. Margeson, J. Luh, Carbon nanotube/cement composites—early results and potential applications, NRC Publ. Rec. (2005) 1-10. https://doi.org/10.1039/B910216G.
G.Y. Li, P.M. Wang, X. Zhao, Pressure-sensitive properties and microstructure of carbon nanotube reinforced cement composites, Cem. Concr. Compos. 29 (2007) 377-382. https://doi.org/10.1016/j.cemconcomp.2006.12.011.
S. Musso, J.M. Tulliani, G. Ferro, A. Tagliaferro, Influence of carbon nanotubes structure on the mechanical behavior of cement composites, Compos. Sci. Technol. 69 (2009) 1985-1990. https://doi.org/10.1016/j.compscitech.2009.05.002.
J.M. Makar, G.W. Chan, Growth of cement hydration products on single-walled carbon nanotubes, J. Am. Ceram. Soc. 92 (2009) 1303-1310. https://doi.org/10.1111/j.1551-2916.2009.03055.x.
B. Han, X. Yu, E. Kwon, A self-sensing carbon nanotube/cement composite for traffic monitoring, Nanotechnology. 20 (2009) 445501. https://doi.org/10.1088/0957-4484/20/44/445501.
X. Yu, E. Kwon, A carbon nanotube/cement composite with piezoresistive properties, Smart Mater. Struct. 18 (2009). https://doi.org/10.1088/0964-1726/18/5/055010.
M.S. Konsta-Gdoutos, Z.S. Metaxa, S.P. Shah, Multi-scale mechanical and fracture characteristics and early-age strain capacity of high performance carbon nanotube/cement nanocomposites, Cem. Concr. Compos. 32 (2010) 110-115. https://doi.org/10.1016/j.cemconcomp.2009.10.007.
S.P. Shah, M . . . Konsta-Gdoutos, Z.S. Metaxa, Exploration of fracture characteristics, nanoscale properties and nanostructure of cementitious matrices with carbon nanotubes and nanofibers, Proc. 7th Int. Conf. Fract. Mech. Concr. Concr. Struct. (2010) 9-12.
A. Chaipanich, T. Nochaiya, W. Wongkeo, P. Torkittikul, Compressive strength and microstructure of carbon nanotubes-fly ash cement composites, Mater. Sci. Eng. A. 527 (2010) 1063-1067. https://doi.org/10.1016/j.msea.2009.09.039.
M.S. Morsy, S.H. Alsayed, M. Agel, Hybrid effect of carbon nanotube and nano-clay on physico-mechanical properties of cement mortar, Constr. Build. Mater. 25 (2011) 145-149. https://doi.org/10.1016/j.conbuildmat.2010.06.046.
D. Gao, M. Sturm, Y.L. Mo, Erratum: Electrical resistance of carbon-nanofiber concrete (Smart Mater. Struct. (2010) 18 (095039), Smart Mater. Struct. 20 (2011). https://doi.org/10.1088/0964-1726/20/4/049501.
T. Nochaiya, A. Chaipanich, Behavior of multi-walled carbon nanotubes on the porosity and microstructure of cement-based materials, Appl. Surf. Sci. 257 (2011) 1941-1945. https://doi.org/10.1016/j.apsusc.2010.09.030.
F. Collins, J. Lambert, W.H. Duan, The influences of admixtures on the dispersion, workability, and strength of carbon nanotube-OPC paste mixtures, Cem. Concr. Compos. 34 (2012) 201-207. https://doi.org/10.1016/j.cemconcomp.2011.09.013.
S. Kawashima, P. Hou, D.J. Corr, S.P. Shah, Modification of cement-based materials with nanoparticles, Cem. Concr. Compos. 36 (2013) 8-15.
B. Wang, Y. Han, S. Liu, Effect of highly dispersed carbon nanotubes on the flexural toughness of cement-based composites, Constr. Build. Mater. 46 (2013) 8-12. https://doi.org/10.1016/j.conbuildmat.2013.04.014.
B. Han, S. Sun, S. Ding, L. Zhang, X. Yu, J. Ou, Review of nanocarbon-engineered multifunctional cementitious composites, Compos. Part A Appl. Sci. Manuf. 70 (2015) 69-81. https://doi.org/10.1016/j.compositesa.2014.12.002.
S. Xu, J. Liu, Q. Li, Mechanical properties and microstructure of multi-walled carbon nanotube-reinforced cement paste, Constr. Build. Mater. 76 (2015) 16-23. https://doi.org/10.1016/j.conbuildmat.2014.11.049.
P.A. Danoglidis, M.S. Konsta-Gdoutos, E.E. Gdoutos, S.P. Shah, Strength, energy absorption capability and self-sensing properties of multifunctional carbon nanotube reinforced mortars, Constr. Build. Mater. 120 (2016) 265-274. https://doi.org/10.1016/j.conbuildmat.2016.05.049.
E.E. Gdoutos, M.S. Konsta-Gdoutos, P.A. Danoglidis, Portland cement mortar nanocomposites at low carbon nanotube and carbon nanofiber content: A fracture mechanics experimental study, Cem. Concr. Compos. 70 (2016) 110-118. https://doi.org/10.1016/j.cemconcomp.2016.03.010.
S.P. Tastani, M.S. Konsta-Gdoutos, S.J. Pantazopoulou, V. Balopoulos, The effect of carbon nanotubes and polypropylene fibers on bond of reinforcing bars in strain resilient cementitious composites, Front. Struct. Civ. Eng. 10 (2016) 214-223. https://doi.org/10.1007/s11709-016-0332-3.
G. Sun, R. Liang, Z. Lu, J. Zhang, Z. Li, Mechanism of cement/carbon nanotube composites with enhanced mechanical properties achieved by interfacial strengthening, Constr. Build. Mater. 115 (2016) 87-92. https://doi.org/10.1016/j.conbuildmat.2016.04.034.
Z.S. Metaxa, E.D. Pasiou, I. Dakanali, I. Stavrakas, D. Triantis, S.K. Kourkoulis, Carbon nanotube reinforced mortar as a sensor to monitor the structural integrity of restored marble epistyles under shear, Procedia Struct. Integr. 2 (2016.
K.M. Liew, M.F. Kai, L.W. Zhang, Carbon nanotube reinforced cementitious composites: An overview, Compos. Part A Appl. Sci. Manuf. 91 (2016) 301-323. https://doi.org/10 1016/j.compositesa.2016.10.020.
B. Balasubramaniam, K. Mondal, K. Ramasamy, G.S. Palani, N.R. Iyer, Hydration phenomena of functionalized carbon nanotubes (CNT)/cement composites, Fibers. 5 (2017) 1-13. https://doi.org/10.3390/fib5040039.
A. Sedaghatdoost, K. Behfarnia, Mechanical properties of Portland cement mortar containing multi-walled carbon nanotubes at elevated temperatures, Constr. Build. Mater. 176 (2018) 482-489. https://doi.org/10.1016/j.conbuildmat.2018.05.095.

(56) References Cited

OTHER PUBLICATIONS

Y. Ruan, B. Han, X. Yu, W. Zhang, D. Wang, Carbon nanotubes reinforced reactive powder concrete, Compos. Part A Appl. Sci. Manuf. 112 (2018) 371-382. https://doi.org/10.1016/j.compositesa.2018.06.025.
P. Sikora, M. Abd Elrahman, S.Y. Chung, K. Cendrowski, E. Mijowska, D. Stephan, Mechanical and microstructural properties of cement pastes containing carbon nanotubes and carbon nanotube-silica core-shell structures, exposed to elevated temperature, Cem. Concr. Compos. 95 (2019) 193-204. https://doi.org/10.1016/j.cemconcomp.2018.11.006.
B.R. Ahmed, A. Hussein, D. Saleh, R.S.M. Rashid, Influence of Carbon Nanotubes ( CNTs ) in the Cement Composites, (2019). https://doi.org/10.1088/1755-1315/357/1/012024.
T. Shi, Y. Gao, D.J. Corr, S.P. Shah, FTIR study on early-age hydration of carbon nanotubes-modified cement-based materials, Adv. Cem. Res. 31 (2019) 353-361. https://doi.org/10.1680/jadcr.16.00167.
M.O. Mohsen, M.S. Al Ansari, R. Taha, N. Al Nuaimi, A.A. Taqa, Carbon Nanotube Effect on the Ductility, Flexural Strength, and Permeability of Concrete, J. Nanomater. 2019 (2019) 1-11. https://doi.org/10.1155/2019/6490984.
G.M. Kim, I.W. Nam, B. Yang, H.N. Yoon, H.K. Lee, S. Park, Carbon nanotube (CNT) incorporated cementitious composites for functional construction materials: The state of the art, Compos. Struct. 227 (2019) 111244. https://doi.org/10.1016/j.compstruct.2019.111244.
Z. Li, D.J. Corr, B. Han, S.P. Shah, Investigating the effect of carbon nanotube on early age hydration of cementitious composites with isothermal calorimetry and Fourier transform infrared spectroscopy, Cem. Concr. Compos. (2020) 103513. https://doi.org/10.1016/j.cemconcomp.2020.103513.
Jennings, Hamlin M., et al. "Characterization and modeling of pores and surfaces in cement paste: correlations to processing and properties." Journal of Advanced Concrete Technology 6.1 (2008): 5-29.
He, Huan, et al. "Modifying Mechanical Strength and Capillary Porosity of Portland Cement-Based Mortar Using a Biosurfactant from Pseudomonas fluorescens." Advances in Materials Science and Engineering 2020 (2020).
Yu, Zechuan, Ao Zhou, and Denvid Lau. "Mesoscopic packing of disk-like building blocks in calcium silicate hydrate." Scientific reports 6.1 (2016): 1-8.
Chuah, Samuel, et al. "Nano reinforced cement and concrete composites and new perspective from graphene oxide." Construction and Building Materials 73 (2014): 113-124.
Yang, Haibin, et al. "A critical review on research progress of graphene/cement-based composites." Composites Part A: Applied Science and Manufacturing 102 (2017): 273-296.
Hu, Yu, et al. "Fracture toughness enhancement of cement paste with multi-walled carbon nanotubes." Construction and Building Materials 70 (2014): 332-338.
Zou, Bo, et al. "Effect of ultrasonication energy on engineering properties of carbon nanotube reinforced cement pastes." Carbon 85 (2015): 212-220.
Cui, Xia, et al. "Mechanical properties and reinforcing mechanisms of cementitious composites with different types of multiwalled carbon nanotubes." Composites Part A: Applied Science and Manufacturing 103 (2017): 131-147.
Ange-Therese Akono, "Fracture toughness of one-and two-dimensional nanoreinforced cement via scratch testing," Phil. Trans. R. Soc. A379-20200288. https://doi.org/10.1098/rsta.2020.0288.
Ange-Therese Akono, Supplementary material for "Fracture toughness of one-and two-dimensional nanoreinforced cement via scratch testing," Phil. Trans. R. Soc. doi: 10.1098/rsta[paper ID in form xxxxxxxxx e.g.-10.1098/rsta.2014.0049]; pp. 1-11 . . . .
Zhifang Zhao et al., "A review on the properties, reinforcing effects, and commercialization of nanomaterials for cement-based materials," Nanotechnology Reviews 2020; 9: 303-322. https://doi.org/10.1515/ntrev-2020-0023.
Hongjian Du et al., "Enhancement of barrier properties of cement mortar with graphene nanoplatelet," Cement and Concrete Research 76 (2015) 10-19.
Fakhim Babak et al., "Preparation and Mechanical Properties of Graphene Oxide: Cement Nanocomposites," Hindawi Publishing Corporation, The Scientific World Journal, vol. 2014, Article ID 276323, pp. 1-10.
Yakovlev et al., Cement Based Foam Concrete Reinforced by Carbon Nanotubes, Materials Science, vol. 12, No. 2, 2006, pp. 147-151.
Mitchell et al., The Effects of Solvents on C—S—H as Determined by Thermal Analysis, Journal of Thermal Analysis and Calorimetry, vol. 86, No. 3, Dec. 2006, pp. 591-594.
Al-Rub et al., On the aspect ratio effect of multi-walled carbon nanotube reinforcements on the mechanical properties of cementitious nanocomposites, Construction and Building Materials, vol. 35, May 31, 2012, pp. 647-655.
Hunashyal et al., Experimental investigation of the effect of carbon nanotubes and carbon fibres on the behaviour of plain cement composite beams, The IES Journal Part A: Civil & Structural Engineering, vol. 4, No. 1, Feb. 10, 2011, pp. 29-36.
Campillo et al., High-Performance Nanostructured Materials for Construction, Nanotechnology in Construction, 2004, pp. 215-225.
Jiang et al., Carbon Nanotubes as a New Reinforcement Material for Modern Cement-Based Binders, Nicom 2: $2^{nd}$ International Symposium on Nanotechnology in Construction, 2006, pp. 209-213.
Luo et al., The influence of surfactants on the processing of multi-walled carbon nanotubes in reinforced cement matrix composites, Phys. Status Solidi A, vol. 206, No. 12, Jul. 27, 2009, pp. 2783-2790.
Ferro et al., Carbon nanotubes cement composites, Frattura ed Integrità Strutturale, vol. 18, 2011, pp. 34-44.
Sobolkina et al., Dispersion of carbon nanotubes and its influence on the mechanical properties of the cement matrix, Cement & Concrete Composites, vol. 34, Aug. 8, 2012, pp. 1104-1113.
Pacheco-Torgal, Nanotechnology: Advantages and drawbacks in the field of construction and building materials, Construction and Building Materials, vol. 25, Aug. 1, 2010, pp. 582-590.
Knapen et al., Effect of free water removal from early-age hydrated cement pastes on thermal analysis, Construction and Building Materials, vol. 23, No. 11, Nov. 2009, pp. 3431-3438.
Han et al., Multifunctional and Smart Carbon Nanotube Reinforced Cement-Based Materials, Chapter 1 from Nanotechnology in Civil Infrastructure—A Paradigm Shift, Kasthurirangan Gopalakrishnan, Bjorn Birgisson, Peter Taylor, and Nii O. Attoh-Okine (Eds.), Springer, 2011, pp. 1-47.
Selvam et al., Application of Nanoscience Modeling to Understand the Atomic Structure of C—S—H, Chapter 3 from Nanotechnology in Civil Infrastructure—A Paradigm Shift, Kasthurirangan Gopalakrishnan, Bjorn Birgisson, Peter Taylor, and Nii O. Attoh-Okine (Eds.), Springer, 2011, pp. 85-102.
Birgisson et al., Optimization of Clay Addition for the Enhancement of Pozzolanic Reaction in Nano-modified Cement Paste, Chapter 7 from Nanotechnology in Civil Infrastructure—A Paradigm Shift, Kasthurirangan Gopalakrishnan, Bjorn Birgisson, Peter Taylor, and Nii O. Attoh-Okine (Eds.), Springer, 2011, pp. 225-236.
Sanchez et al., Nanotechnology in concrete—A review, Construction and Building Materials, vol. 24, May 15, 2010, pp. 2060-2071.
Melo et al., Macro- and Micro-Characterization of Mortars Produced with Carbon Nanotubes, ACI Materials Journal, vol. 108, No. 3, May-Jun. 2011, pp. 327-332.
Chen et al., Carbon nanotube-cement composites: A retrospect, The IES Journal Part A: Civil & Structural Engineering, vol. 4, No. 4, Sep. 19, 2011, pp. 254-265.
The International Search Report and the Written Opinion issued on Jun. 9, 2021 for International application No. PCT/US2021/15651; pp. 1-14.
Chi et al., Preparation and Mechanical Properties of Potassium Metakaolin Based Geopolymer Paste Feb. 19, 2019 (Jan. 19, 2019) Advanced Engineering Forum, vol. 31; pp. 38-45.
Dimitrova et al., Non-aqueous Surfactant-free Antiform Emulsions: Properties and Triggered Release Feb. 2014, The Canadian Journal of Chemical Engineering, vol. 92; pp. 330-336.

(56) References Cited

OTHER PUBLICATIONS

Thomas Chudoba, "Measurement of Hardness and Youngs Modulus by Nanoindentation," Chapter 6, Nanostructured Coatings, Copyright 2006; pp. 1-5.
Wikipedia 'Elastic Modulus' May 21, 2018 (21.05.208) retrieved from, https://en.wikipedia.org/w/index.php?title+Elastic_modulus&oldid+842299072>, pp. 1-4.
Meng et al., "Improving the Flexural Performance of Ultra-High-performance Concrete by Rheology Control of Suspending Mortar," Abstract, Improved Flexural Performance of Ultra-High-Performance Concrete by Rheology Control of Suspending Mortar, Jun. 1, 2019 (Jun. 1, 2019); pp. 1-4.
Dong et al., "Effects of Carboxylated Multiwalled Carbon Nanotubes on the Function of Macrophages," *Journal of Nanomaterials*, 2015, vol. 2015, Article ID 638760; pp. 1-9. http://dx.doi.org/10.1155/2015/638760.
Li et al., "Single-walled carbon nanotubes as ultrahigh frequency nanomechanical resonators," *Physical Review B*, 2003, vol. 68; pp. 073405-1-073405-3.
Graziele da Luz et al., "Effect of pristine and functionalized carbon nanotubes on microstructural, rheological, and mechanical behaviors of metakaolin-based geopolymer," *Cement and Concrete Composites*, 2019, vol. 104, 103332; pp. 1-2.
Ghasan F. Huseien et al., "Effect of metakaolin replaced granulated blast furnace slag on fresh and early strength properties of geopolymer mortar," *Ain Shams Engineering Journal*, 2018, vol. 9; pp. 1557-1566.
Ange-Therese Akono, "Fracture behavior of metakaolin-based geopolymer reinforced with carbon nanofibers," *Ceramic Engineering & Science*, 2020; pp. 234-242. DOI: 10.1002/ces2.10060.
Pavel Rovnanik et al., "Effect of carbon nanotubes on the mechanical fracture properties of fly ash geopolymer," *Procedia Engineering*, 2016, vol. 151; pp. 321-328.
Sun, Xiaoyan, et al. "Influence of multi-walled nanotubes on the fresh and hardened properties of a 3D printing PVA mortar ink," *Construction and Building Materials* 247 (2020): 118590.
Su, Zijian, Wei Hou, and Zengqing Sun. "Recent advances in carbon nanotube-geopolymer composite," *Construction and Building Materials* 252 (2020): 118940.
Pongsak Jittabut et al., "Physical and Microstructure Properties of Geopolymer Nanocomposite Reinforced with Carbon Nanotubes," *Materials Today: Proceedings* 17 (2019): 1682-1692.
Yuan, Jingkun, et al. "In situ processing of MWCNTs/leucite composites through geopolymer precursor," *Journal of the European Ceramic Society* 37.5 (2017): 2219-2226.
Ma, Y., G. Ye, and J. Hu, "Micro-mechanical properties of alkali-activated fly ash evaluated by nanoindentation," *Construction and Building Materials* 147 (2017): 407-416.
Nur Yazdani et al., "Carbon Nano-Tube and Nano-Fiber in Cement Mortar: Effect of Dosage Rate and Water-Cement Ratio," *International Journal of Material Science* (IJMSCI), Jun. 2014, vol. 4, Issue 2; pp. 45-52. Doi: 10.14355/ijmsci.2014.0402.01.

R.A. Sa Ribeiro et al., "A Review of Particle- and Fiber-Reinforced Metakaolin-Based Geopolymer Composites," *Journal of Ceramic Science and Technology*, 08[3] 307-322 (2017). DOI: 10.4416/JCST2017-00048.
Tiesong Lin et al., "Effects of fiber length on mechanical properties and fracture behavior of short carbon fiber reinforced geopolymer matrix composites," *Materials Science and Engineering A* 497 (2008) 181-185.
Saloumeh Mesgari Abbasi et al., "Microstructure and mechanical properties of a metakaolinite-based geopolymer nanocomposite reinforced with carbon nanotubes," *Ceramics International* 42 (2016) 15171-15176.
Natali et al., "Novel fiber-reinforced composite materials based on sustainable geopolymer matrix," *Procedia Engineering* 21 (2011) 1124-1131.
Peigang He et al., "Effects of high-temperature heat treatment on the mechanical properties of unidirectional carbon fiber reinforced geopolymer composites," *Ceramics International* 36 (2010) 1447-1453.
Mohamed Saafi et al., "Multifunctional properties of carbon nanotube/fly ash geopolymeric nanocomposites," *Construction and Building Materials* 49 (2013) 46-55.
Reales OA, Toledo Filho RD. A review on the chemical, mechanical and microstructural characterization of carbon nanotubes-cement based composites. *Constr. Build. Mat.* Nov. 15, 2017;154; 697-710.
Liu J, Fu J, Ni T, Yang Y. Fracture toughness improvement of multi-wall carbon nanotubes/graphene sheets reinforced cement paste. *Constr. Build. Mat.* Mar. 10, 2019;200; 530-538.
Konsta-Gdoutos MS, Metaxa ZS, Shah, SP. Highly dispersed carbon nanotube reinforced cement based materials. *Cem. Concr. Res.* 2010;40 (7); 1052-1059.
Luo JL, Duan ZD, Zhao TJ, Li QY. Effect of multi-wall carbon nanotube on fracture mechanical property of cement-based composite. *Adv. Mat. Res.* 2011;146; 581-584.
Alafogianni P, Dassios K, Tsakiroglou CD, Matikas TE, Barkoula NM. Effect of CNT addition and dispersive agents on the transport properties and microstructure of cement mortars. *Constr. Build. Mat.* Feb. 10, 2019;197; 251-261.
Parveen S, Rana S, Fangueiro R. A review on nanomaterial dispersion, microstructure, and mechanical properties of carbon nanotube and nanofiber reinforced cementitious composites. *J. Nanomater.* Jan. 1, 2013. Doi: 10.1155/2013/710175.
Metaxa ZS, Konsta-Gdoutos MS, Shah SP. Carbon nanofiber cementitious composites: effect of debulking procedure on dispersion and reinforcing efficiency. *Cem. Concr. Comp.* Feb. 1, 2013;36; 25-32.
Tyson BM, Abu Al-Rub RK, Yazdanbakhsh A, Grasley Z. Carbon nanotubes and carbon nanofibers for enhancing the mechanical properties of nanocomposite cementitious materials. *J. Mater. Civil Eng.* 2011;23; 1028-1035.
Jiaxin Chen et al., "Influence of Multi-walled carbon nanotubes on the hydration products of ordinary Portland cement paste," *Cement and Concrete Research* 137 (2020) 106197.

* cited by examiner

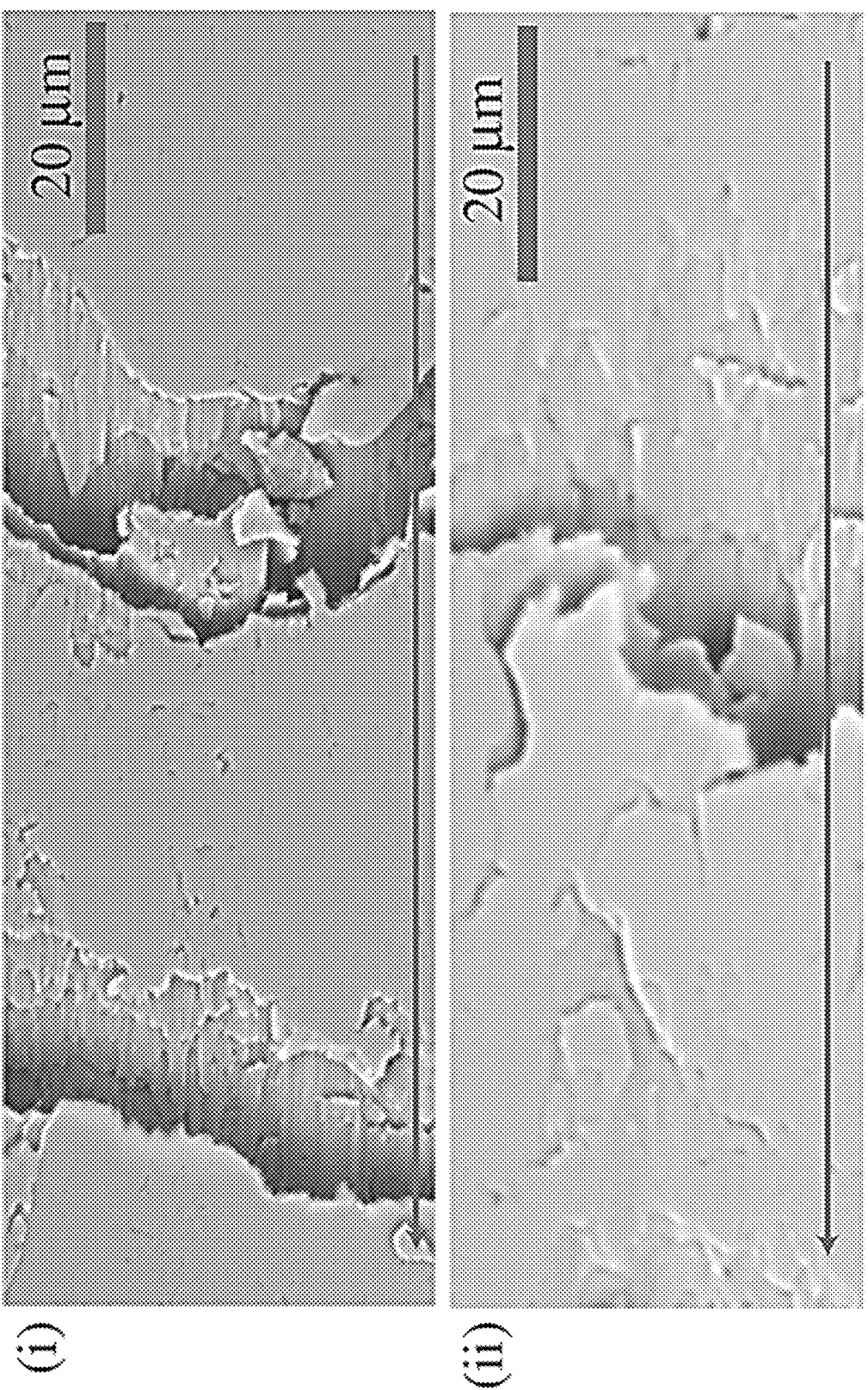

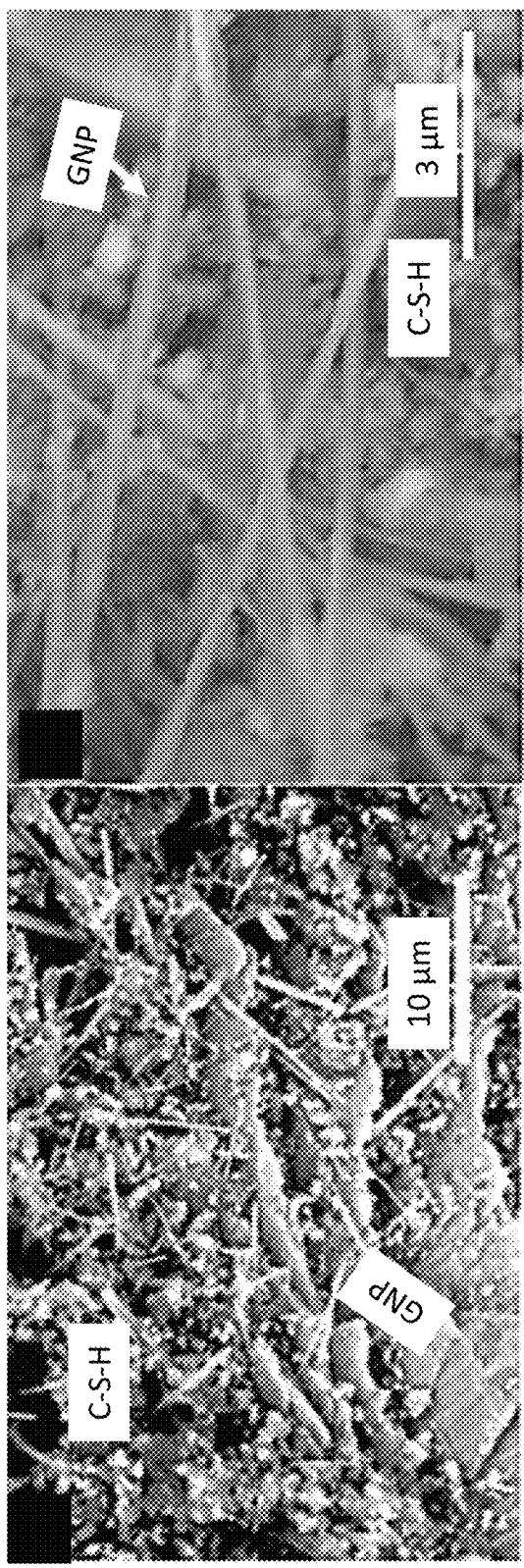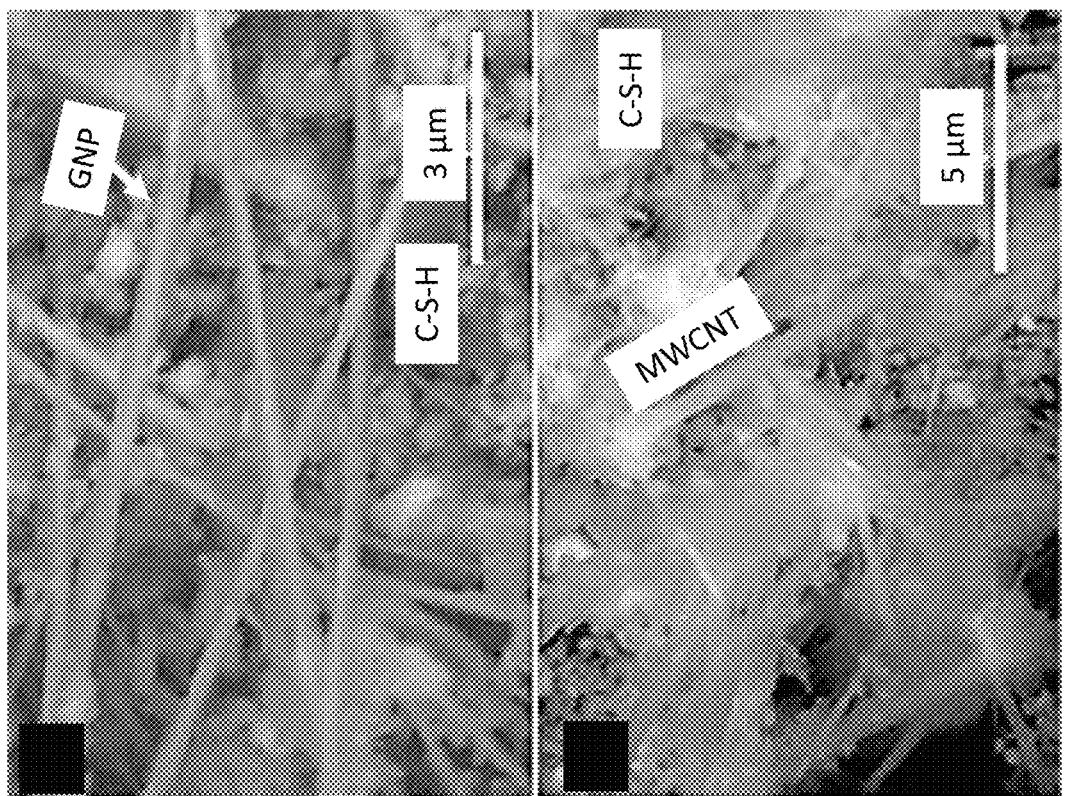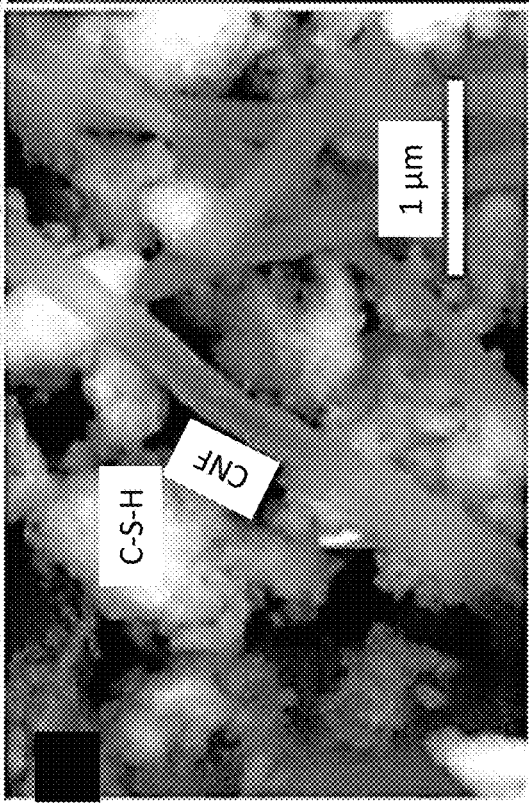

CEMENTS REINFORCED WITH GRAPHENE NANOPLATELETS OR HELICAL CARBON NANOTUBES

CROSS-REFERENCE TO RELATED APPLICATIONS

The present application claims priority to U.S. provisional patent application No. 63/144,347 that was filed Feb. 1, 2021, the entire contents of which are incorporated herein by reference.

REFERENCE TO GOVERNMENT RIGHTS

This invention was made with government support under 1829101 awarded by the National Science Foundation. The government has certain rights in the invention.

BACKGROUND

Concrete is the second most-consumed resource on Earth after water. Cement is an essential ingredient in concrete. However, the production of a tonne of cement releases a tonne of carbon dioxide into the atmosphere. As a result, the cement industry produces a substantial fraction of global human-caused carbon dioxide emissions.

A significant way to decrease the carbon footprint of cement is to develop cements with improved fracture resistance to reduce the volume needed to design buildings and structures. In recent years, carbon-based nanomaterials have attracted much attention as a potential reinforcement for cement due to their extraordinary properties. For instance, carbon nanotubes exhibit a tensile strength of 5-100 GPa and Young's modulus of 1 TPa. (Zhou G et al. Chem. Phys. Lett. 2001; 333 (5):344-9; Wu A S, et al., Carbon. 2012; 50 (10):3876-81; Li F, et al., Appl. Phys. Lett. 2000; 77 (20):3161-3; Zhang R, et al., Adv. Mater. 2011; 23 (30): 3387-3391; Peng B, et al., Nat. Nanotech. 2008; 3:626-631.) Meanwhile, graphene exhibits a tensile strength of 130 GPa and Young's modulus of 1 TPa. (Lee C, et al., Science. 2008; 321 (5887):385-388.) Several studies have reported significant gains in stiffness and strength using cement nanocomposites reinforced with carbon-based nanomaterials. (Shi T, et al., Constr. Build. Mat. 2019; 202 (30):290-307; Reales O A et al., Constr. Build. Mat. 2017 November 15; 154:697-710; Yang H, et al., Compos. Part A: Appl. Sci. Manuf 2017 Nov. 1; 102:273-296; Chuah S, et al., Constr. Build. Mat. 2014 Dec. 30; 73:113-124.) The improvement in mechanical properties is usually followed by an enhancement in multifunctional response, such as electrical conductivity or strain-sensing capabilities. In particular, a critical issue has been to increase the fraction of carbon-based nanomaterials—to maximize the multifunctional behavior—while controlling the microstructure and improving the mechanical characteristics. However, when it comes to mechanical performance, the primary criterion has been strength. The issue is that a strength-focused performance criterion cannot account for defects, which are pervasive at the structural level, nor can it account for fracture, which plays an important role in failure.

SUMMARY

Graphene nanoplatelet (GNP)-cement composites and helical carbon nanotube (HX)-cement composites with high concentrations of GNPs or HXs are provided.

Illustrative embodiments of the cement composite comprise: Portland cement; and graphene nanoplatelets or helical carbon nanotubes, wherein: the cement composite is free of chemical dispersing aids; the cement composite has a fracture toughness of at least 0.65 MPa$\sqrt{m}$; the cement composite has a porosity of no greater than 8.5%; and the cement composite has a water absorption of no greater than 4.5%.

BRIEF DESCRIPTION OF THE DRAWINGS

Illustrative embodiments of the invention will hereafter be described with reference to the accompanying drawings, wherein like numerals denote like elements.

FIG. 1B, panels (i) and (ii), shows back-scattered environmental scanning electron micrographs (BESEMs) of the residual groove after progressive-load scratch testing on cold-rolled steel. The arrows indicate the direction of the scratch test. FIG. 1C shows a side view. FIG. 1D shows a front view. The hatched area A is the horizontally projected load-bearing contact area. The dotted line p is the perimeter. $F_T$ is the horizontal force and d is the penetration depth. Adopted from Akono et al., 2012, with permission from Cambridge University Press.

FIGS. 2A-2D show BESEM of plain cement and cement nanocomposites. Unless otherwise noted, all specimens were imaged after seven days of hydration. FIGS. 2A-2B show graphene-reinforced cement, GNP-5. FIG. 2C shows carbon nanofiber-reinforced cement, CNF-5. FIG. 2D shows multiwalled carbon nanotube-reinforced cement, MWCNT-5. C-S-H=calcium silicate hydrates. GNP=graphene nanoplatelets. CNF=carbon nanofiber. MWCNT=multiwalled carbon nanotubes.

FIG. 3A shows carbon nanofiber-reinforced cement (CNF-2). The dotted arrow indicates the direction of the motion of the scratch probe. FIG. 3B shows graphene-reinforced cement (GNP-2). FIG. 3C shows multiwalled carbon nanotube-reinforced cement (MWCNT-2). FIG. 3D shows helical carbon nanotube-reinforced cement (HX-2).

FIG. 4A shows a load-depth curve. FIG. 4B shows a residual groove after scratch testing. FIG. 4C shows a fracture scaling curve. $F_T$ is the horizontal force, d is the penetration depth, R is the scratch probe tip radius, and 2 pA is the scratch probe shape function. $K_c$ is the fracture toughness.

(FIG. 10A) Fracture toughness scaling. (FIG. 10B) load-depth curve. (FIG. 10C) Fracture toughness scaling. (FIG. 10D) load-depth curve.

DETAILED DESCRIPTION

Figure 1A:
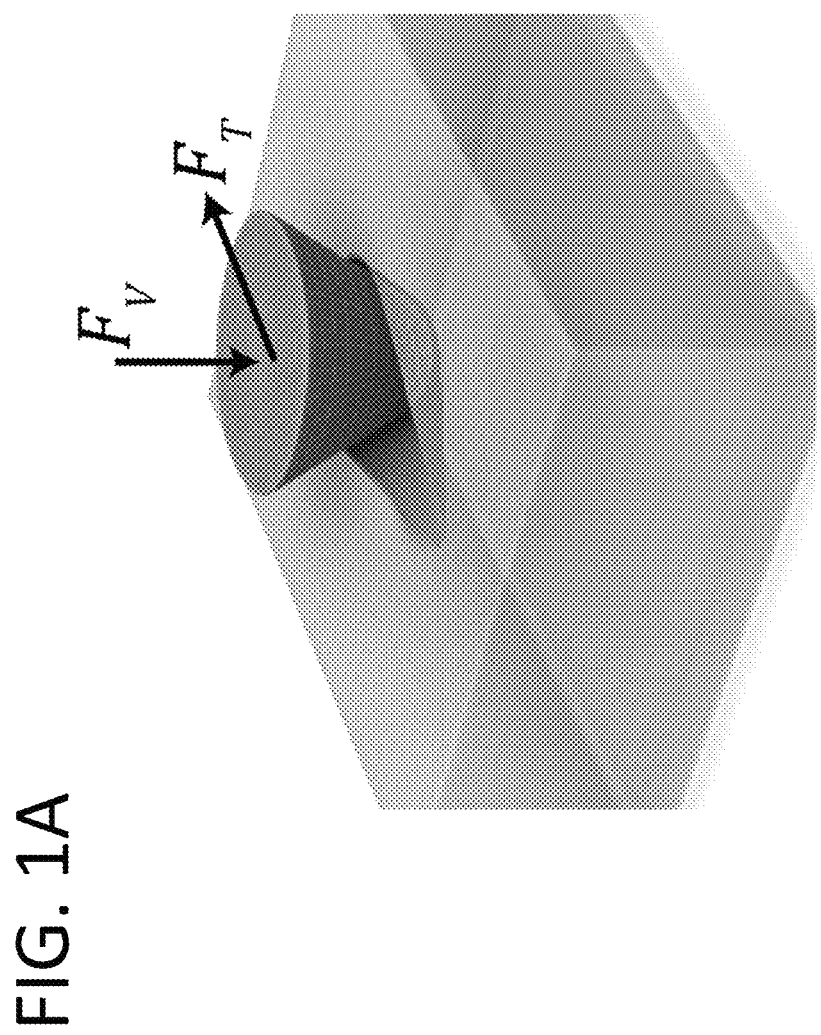
FIG. 1A shows a schematic diagram of a scratch test equipment set-up.

Methods for the synthesis of GNP-cement composites and HX-cement composites with high concentrations of GNPs or HXs that do not require chemical dispersing aids, such as superplasticizers, dispersion-enhancing chemical surface functionalization, forming agents, or other types of nanoparticles are provided. Also provided are GNP-cement composites and HX-cement composites made using the methods.

The methods are able to disperse high mass fractions of carbon-based nanomaterials-particularly GNPs and HX—in cement matrices while enhancing fracture toughness. The methods use mechanical dispersion to reduce the agglomeration of the nanomaterial fillers that usually hinders the workability of cement slurries, promote the formation of macropores in nanofiller-reinforced cements, and limit load transfer mechanisms within the hardened cement nanocomposites.

The GNPs are flakes composed of small stacks of graphene sheets, graphene being an allotrope of carbon in which the carbon atoms are $sp^2$-bonded in a planar sheet. The GNPs can be made by exfoliating graphite down to a small number of sheets—typically about 3 to 20 sheets. The GNPs typically have lateral dimensions (i.e., lengths and widths) of at least 1 μm and, more typically, 2 μm or greater. By way of illustration, GNPs having lateral dimensions in the range from 1 μm to 10 μm can be used. The GNPs typically have thicknesses of less than 50 nm and, more typically, 20 nm or lower. By way of illustration, GNPs having a thickness in the range from 5 nm to 20 nm can be used. However, GNPs with dimensions outside of the ranges recited here can be used.

The HXs are carbon nanotubes with a coiled configuration in which multiwalled carbon nanotubes are wrapped in a helical pattern. HXs typically have an average outside diameter in the range from 10 nm to 500 nm, including in the range from 100 nm to 300 nm, and an average length in the range from 1 μm to 20 μm, including in the range from 1 μm to 10 μm. However, CNFs with dimensions outside of the ranges recited here can be used. Depending on their methods of production, a sample of HXs may include regular (non-helical) CNTs as an impurity. Therefore, when a mass loading (wt. %) of HXs in a cement composite is recited herein, the mass includes any non-helical CNTs that are introduced as an impurity. However, the HX samples referenced herein will have an HX purity of at least 70 percent, based on weight, and more preferably an HX purity of at least 80%, at least 90%, at least 99%, based on weight.

The cement composites have improved properties that may be attributed, at least in part, to the development of a multistep dispersion and mixing protocol that forgoes the use of chemical dispersants and dispersion-enhancing surface functionalities in favor of intensive mechanical dispersion using an ultrasonic dispersion with a dispersion energy that scales quadratically with respect to the mass fraction of the GNPs or HXs. This protocol, in which the ultrasonic dispersion of the GNPs or HXs is followed by extensive mechanical mixing at high speed and high shear, alters the distribution of hydration products and/or pore sizes in the cured cements relative to the distribution of hydration products and/or pores sizes in cured cements, including other GNP- or HX-reinformed cements, made using other dispersion and mixing protocols.

In the cement composites, the mechanically dispersed GNPs and HXs bridge air voids and reduce crack widths, thereby refining the pore size and strengthening the C-S-H matrix, as evidenced by increased fracture toughness. In particular, the mechanically dispersed GNPs and HXs may promote an increase in high-density C-S-H, at the expense of low-density C-S-H, relative to GNP- and HX-cement composites made using other methods. In addition to an increase in the concentration of high-density C-S-H, an increase in the concentration of other hydration products, such as calcium hydroxide and/or ultra-high-density C-S-H, may also be achieved. High density C-S-H is a hydrated cement phase composed of globules packed in a hexagonally-closed packed arrangement with a packing density of about 0.74 (e.g., 0.72-0.76). Low-density C-S-H is a hydrated cement phase composed of C-S-H packed loosely with a packing density of about 0.64 (e.g., 0.64-0.66). Ultra-high-density C-S-H is a hydrated cement phase composed of C-S-H packed loosely with a packing density of about 0.87 (e.g., 0.82-0.87). High-density C-S-H is characterized by smaller internal (gel) pores than low-density C-S-H. By way of illustration, the average gel pore size for a high-density C-S-H phase is typically less than about 3 nm (e.g., from 1.2 nm to about 2 nm), while the average gel pore size for low-density C-S-H is typically greater than about 5 nm (e.g., from about 5 nm to about 12 nm).

Gel pores are nano-scale pores that are internal to the C-S-H phases of the cured cement, while the space in the cured cement that is not filled by the solid products of hydration is the capillary pore space. Capillary pores are typically much larger than gel pores and may include microscale and mesoscales pores (e.g., pores having sizes of 100 nm or greater). The total porosity of the cured cement composite is the combined capillary porosity and gel porosity.

The changes in microstructure of the cement composites containing the mechanically dispersed GNPs or HXs are accompanied by an increased fracture toughness, relative to non-reinforced cements or GNP- or HX-reinforced cements made using other methods. For example, GNP- and HX-reinforced cements having fracture toughness of at least 0.65 MPa√m are provided. In addition, the GNP- and HX-reinforced cements may be characterized by reduced porosities and enhanced water resistance (decreased water absorption). For example, GNP- and HX-reinforced cements having a porosity of no greater than 8.5% and a water absorption of no greater than 4.5% are provided.

Potential applications of the cement composites described herein include: smart infrastructure materials; building materials with electrical sensors and smart technology; three-dimensional (3D) printing of construction materials, buildings, and structural elements; marine engineering; transportation, bridges, and roads; smart infrastructure materials for structural health monitoring; piezoresistive sensors for structural health monitoring; smart sensors for structural health monitoring; strain-sensing and damage-sensing construction materials; and construction materials for electromagnetic interference shielding applications.

Methods of Making GNP-Cement Composites and HX-Cement Composites

The methods of making the GNP- and HX-cement composites include three steps: a pre-dispersion of the GNPs or the HXs in deionized water using ultrasonic energy; mixing the resulting dispersion with unhydrated cement using ultra-high speed, high-shear conditions that promote nanoparticle cluster dispersion and accelerate cement hydration; and continuous mechanical stirring during the initial stage of curing to reduce or eliminate air voids. In the second and third steps, the cement grains are useful in further dispersing any nanomaterial aggregates.

In an initial step of the dispersion and mixing protocol, GNPs or HXs are dispersed in water using ultrasonic energy prior to being mixed with cement powder. The amount of water that is used in the dispersion corresponds to the amount of water to be used in the GNP-cement mixture or in the HX-cement mixture. The water is preferably, but not necessarily, deionized. No dispersion-enhancing chemical surface functionalization, chemical dispersing aids, such as superplasticizers or other surfactants, or other chemical additives, such as foaming agents, are needed. As used herein, a chemical dispersing aid refers to a chemical that enhances the degree of dispersion of the GNPs or HXs in water, relative to the degree of dispersion of the GNPs or HXs in water in the absence of the chemical. Similarly, dispersion-enhancing chemical surface functionalization refers to surface functional groups that are covalently or non-covalently bonded to the GNPs or the HXs and that enhance the degree of dispersion of the GNPs or HXs in water, relative to the degree of dispersion of the GNPs or HXs in water in the absence of the surface functional groups. Carboxylate superplasticizers are examples of chemical dispersing agents that are commonly used in nanoparticle-reinforced cement composites that can be excluded from the GNP- and HX-reinforced cement composites. It should be noted, however, that while some embodiments of the cement composites are free of chemical dispersing aids and chemical surface functionalization, some embodiments of the cement composites may utilize CNPs or HXs that have chemical surface functionalization, but are still free of chemical dispersing aids.

The ultrasonic dispersion energy, which can be provided by an ultrasonic horn, is desirably quadratically proportional to the mass fraction of the GNPs or the HXs. By way of illustration, to make cement composites having mass fractions of GNPs or HXs in the range from 0.1 weight percent (wt. %) to 0.5 wt. %, ultrasonic energies in the range from about 1.8 kJ per gram of carbon nanotubes per L of water (kJ/(g/L)) to about 18 kJ/(g/L) can be used. In contrast, the ultrasonic energy used in more conventional dispersion protocols for the production of nanomaterial-reinforced cements is linearly proportional to the fraction of nanomaterials.

In order to gain best sonics performance, a half inch diameter sonic probe is desirably centered under the container containing the GNP dispersion or the HX dispersion. Because high dispersion energies may produce high thermal energies and increase the temperature of the dispersion, which leads to water evaporation, an ice bath can be used to decrease the temperature. In addition, in order to reduce heating, the dispersion energy can be pulsed or delivered in a repeating cycle loop.

The aqueous dispersion of GNPs or HXs is then added to raw cement powder in a mixing container, and the resulting cement paste can be mixed with a high speed, high shear mixer to provide additional mechanical dispersion, deagglomeration, and uniform mixing. The cement is a binder made from silicates and aluminates. Portland cement is a cement composed of a mixture of lime (calcium oxide), silica ($SiO_2$), alumina ($Al_2O_3$), iron oxide ($Fe_2O_3$) and gypsum ($CaSO_4$). High-speed, high-shear mixing may be carried out using a propeller stirrer at a speed of 200 rpm or higher for a time of 2 minutes or longer for the GNP-cement composites or at a speed of 800 rpm or higher for a time of 2 minutes or longer for the HX-cement composites. By way of illustration, to make cement composites having mass fractions of GNPs or HXs in the range from 0.1 weight percent (wt. %) to 0.5 wt. %, speeds in the range from about 200 rpm to about 1000 rpm can be used.

The cement paste can then be allowed to cure. During curing, the cement undergoes hydration reactions, which are initiated by the addition of the aqueous dispersion. These hydration reactions produce various phases in the cured cement, including low-density C-S-H, high-density C-S-H, ultra-high-density C-S-H, and calcium hydroxide. Curing may take place during a molding process, whereby the freshly made cement paste is cast and molded by pouring the GNP-cement paste or the HX-cement paste into a mold. A lubricant, such as palm oil, may be used to lubricate the mold, and a moisture barrier, such as plastic wrap, may be used to seal the mold to prevent moisture from escaping during curing. During curing, the mixture continues to be stirred to remove microscopic air bubbles and further mechanically disperse the GNPs or HXs. This can be accomplished using, for example, the centrifugal force provided by an orbital shaker. This mixing and curing step is carried out for a substantial duration, typically 24 hours or longer (e.g., 1-2 days). After curing, the resulting GNP-cement composite or HX-cement composite is sufficiently hardened to be demolded. The demolded composite may then be placed in water (preferably deionized) in a sealed container for further curing.

Generally, the GNP or HX dispersion will contain sufficient water to achieve adequate hydration of the cement without the need to add additional water during curing. For example, the water content of the GNP dispersion or the HX dispersion that is added to a given quantity of cement powder can be selected to provide a cement paste having a water to cement ratio (w/c) of at least about 0.3 grams of water per gram of cement. This includes embodiments of the cement pastes that have a w/c in the range from about 0.3 to about 0.5, including the range from about 0.4 to 0.5, and further including the range from about 0.42 to about 0.46. During curing, the cement paste should be maintained at a temperature that allows for the hydration to occur. For the pastes described herein, suitable curing temperatures include temperatures in the range from about 20° C. to about 40° C., including temperatures in the range from 22° C. to 24° C. (e.g., room temperature (23° C.)), and suitable curing times include a period of 24 hours up to 28 days. However, temperatures and times outside of these ranges can be used, and full curing of the cement need not occur in the recited time period.

Notably, the GNP dispersions, the HX dispersions, the GNP-cement pastes, the HX-cement pastes, and the composites made therefrom do not require the GNPs or the HXs to be surface-functionalized and do not require the use of chemicals (e.g., chemical compounds and molecules) that enhance the dispersion of the GNPs or HXs in water, relative to their dispersion in the absence of such agents. Thus, the dispersions and the pastes and composites can be free of surfactants, such as gum Arabic and sodium dodecyl sulfate; alcohols, such as isopropanol; superplasticizers, such as polycarboxylates; acids, such as sulfuric acid and/or nitric acid; organic ammonium chloride; polymers, such as styrene butadiene rubber copolymers; and/or fly ash, and the GNPs and HXs themselves can be free of covalently and non-covalently bonded surface functionalities, such as carboxyl groups. In fact, the aqueous GNP dispersions may consist of only GNPs and water, and the GNP-cement pastes may consist of only GNPs, cement, and water. Similarly, the aqueous HX dispersions may consist of only HXs and water, and the HX-cement pastes may consist of only HXs, cement, and water.

Embodiments of GNP-Cement Composites

The GNP-cement composites include composites having a fracture toughness in the range from 0.65 MPa$\sqrt{m}$ to 0.75 MPa. This includes GNP-cement composites having a fracture toughness in the range from 0.70 MPa$\sqrt{m}$ to 0.73 MPa$\sqrt{m}$. This represents a substantial increase in the fracture toughness of the corresponding cement (e.g., plain cured Portland cement that has undergone the same mixing and curing process) in the absence of the GNP reinforcement. By way of illustration, the fracture toughness of the GNP-cement composites can be increased by at least 5% (e.g., increases in the range from about 5% to about 12%) for composites having a GNP concentration in the range from about 0.1 wt. % to about 0.5 wt. %, relative to the corresponding, unreinforced cement. Fracture toughness can be measured using a nonlinear fracture mechanics model, as described in the Example.

The GNP-cement composites include composites having a low porosity. For example, some GNP-cement composites made in accordance with the methods described herein have porosity in the range from 4.5% to 7.5%. This includes GNP-cement composites having a porosity in the range from 4.5 to 5.0%. This represents a substantial decrease in porosity relative to the corresponding cement (e.g., plain cured Portland cement that has undergone the same mixing and curing process) in the absence of the GNP reinforcement. By way of illustration, the porosity of the GNP-cement composites can be decreased by at least 25% (e.g., decreases in the range from about 25% to about 50%) for composites having a GNP concentration in the range from about 0.1 wt. % to about 0.5 wt. %, relative to the corresponding, unreinforced cement. Porosity can be measured using a modified ASTM C20-00(2015), as described in the Example.

The GNP-cement composites include composites having a low water absorption. For example, some GNP-cement composites made in accordance with the methods described herein have a water absorption in the range from 2.0% to 4.0%. This includes GNP-cement composites having a water absorption in the range from 2.5 to 3.5%. This represents a substantial decrease in water absorption relative to the corresponding cement (e.g., plain cured Portland cement that has undergone the same mixing and curing process) in the absence of the GNP reinforcement. By way of illustration, the porosity of the GNP-cement composites can be decreased by at least 30% (e.g., decreases in the range from about 30% to about 50%) for composites having a GNP concentration in the range from about 0.1 wt. % to about 0.5 wt. %, relative to the corresponding, unreinforced cement. Water absorption can be measured using a modified ASTM C20-00(2015), as described in the Example.

The GNPs and the Portland cement may be the only components present in the cement composites. However, it is also possible for other components to be present as minor components. Typically, if other components are present, they are not chemical dispersing aids or dispersion-enhancing chemical surface functionalities and they are present at concentrations of less than 5 wt. %. For example, the GNP-cement composites can include small amounts of water condensed on the composites due to the humidity of the surrounding environment and/or small concentrations of impurities introduced with the starting products; such cement composites are characterized as "consisting essentially of" GNPs and Portland cement. Typically, if impurities are present, they are present at concentrations of less than 0.5 wt. %, more typically at concentrations of less than 0.1 wt. %, and still more typically at concentrations of less than 0.05 wt. %.

In some of the embodiments of the GNP-cement composites, unhydrated clinker (i.e., raw cement powder grains) is present, along with hydration phases.

Embodiments of HX-Cement Composites

The HX-cement composites include composites having a fracture toughness in the range from 0.65 MPa$\sqrt{m}$ to 0.75 MPa$\sqrt{m}$. This includes HX-cement composites having a fracture toughness in the range from 0.70 MPa$\sqrt{m}$ to 0.73 MPa$\sqrt{m}$. This represents a substantial increase in the fracture toughness of the corresponding cement (e.g., plain cured Portland cement that has undergone the same mixing and curing process) in the absence of the HX reinforcement. By way of illustration, the fracture toughness of the HX-cement composites can be increased by at least 5% (e.g., increases in the range from about 4% to about 13%) for composites having a HX concentration in the range from about 0.1 wt. % to about 0.5 wt. %, relative to the corresponding, unreinforced cement. Fracture toughness can be measured using a nonlinear fracture mechanics model, as described in the Example.

The HXs, along with any non-helical CNT impurity, if present, and the Portland cement, may be the only components present in the cement composites. However, it is also possible for other components to be present as minor components. Typically, if other components are present, they are not chemical dispersing aids or dispersion-enhancing chemical surface functionalities and they are present at concentrations of less than 5 wt. %. For example, the HX-cement composites can include small amounts of water condensed on the composites due to the humidity of the surrounding environment and/or small concentrations of impurities introduced with the starting products; such cement composites are characterized as "consisting essentially of" HXs and Portland cement. Typically, if impurities are present, they are present at concentrations of less than 0.5 wt. % and more typically at concentrations of less than 0.1 wt. %.

The HX-cement composites include composites having a low porosity. For example, some HX-cement composites made in accordance with the methods described herein have porosity in the range from 6.8% to 8.5%. This includes HX-cement composites having a porosity in the range from 7.0 to 8.0%. This represents a substantial decrease in porosity relative to the corresponding cement (e.g., plain cured Portland cement that has undergone the same mixing and curing process) in the absence of the HX reinforcement. By way of illustration, the porosity of the HX-cement composites can be decreased by at least 15% (e.g., decreases in the range from about 15% to about 28%) for composites having a HX concentration in the range from about 0.1 wt. % to about 0.5 wt. %, relative to the corresponding, unreinforced cement. Porosity can be measured using a modified ASTM C20-00(2015), as described in the Example.

The HX-cement composites include composites having a low water absorption. For example, some HX-cement composites made in accordance with the methods described herein have a water absorption in the range from 3.5% to 4.5%. This includes HX-cement composites having a water absorption in the range from 3.5 to 4.0%. This represents a substantial decrease in water absorption relative to the corresponding cement (e.g., plain cured Portland cement that has undergone the same mixing and curing process) in the absence of the HX reinforcement. By way of illustration, the porosity of the HX-cement composites can be decreased by at least 20% (e.g., decreases in the range from about 20% to about 30%) for composites having a HX concentration in the range from about 0.1 wt. % to about 0.5 wt. %, relative to the corresponding, unreinforced cement. Water absorption can be measured using a modified ASTM C20-00(2015), as described in the Example.

In some of the embodiments of the HX-cement composites, clinker is present, along with hydration phases.

Methods for measuring the values of quantifiable properties (e.g., fracture toughness, porosity, water absorption, etc.) of cement composites are provided in the Example below. Unless otherwise indicated, the recited values for quantifiable properties that are temperature and/or pressure dependent are for the values as measured at room temperature (23° C.) and/or atmospheric pressure.

Example

This example illustrates the fracture response of Portland cement reinforced with 1D and 2D carbon-based nanomaterials, with an emphasis on helical carbon nanotubes and graphene oxide nanoplatelets. Novel processing routes were shown to incorporate 0.1-0.5 wt. % of nanomaterials into cement using a quadratic distribution of ultrasonic energy, although higher concentrations can be achieved. Scratch testing was used to probe the fracture response by pushing a sphero-conical probe against the surface of the material under a linearly increasing vertical force. Fracture toughness was then computed using a nonlinear fracture mechanics model. Nanomaterials were shown to bridge nanoscale air voids, leading to pore refinement and a decrease in the porosity and the water absorption. An improvement in fracture toughness was observed in cement nanocomposites, with a positive correlation between the fracture toughness and the mass fraction of nanomaterial for graphene-reinforced cement. Moreover, for graphene-reinforced cement, the fracture toughness values were in the range of 0.701 to 0.717 MPa$\sqrt{m}$. Thus, this example illustrates the use of nanomaterials to toughen cement while improving the microstructure and water resistance properties.

This example employed a novel fracture assessment method and novel synthesis protocols to demonstrate the impact of carbon-based nanomaterials on the fracture of cement reinforced with nanomaterials. The focus was on graphene nanoplatelets, carbon nanofibers, multiwalled carbon nanotubes, and helical carbon nanotubes. To this end, scratch testing was employed, which involved pushing a sphero-conical probe across the surface of the specimen.

Materials and Methods

Cement Nanocomposite Design and Synthesis

Cement composites reinforced with carbon-based nanomaterials were synthesized. Four types of carbon-based nanomaterials were selected: carbon nanofibers (CNF), multiwalled carbon nanotubes (MWCNT), helical carbon nanotubes (HX), and graphene nanoplatelets (GNP). The carbon nanofibers were sourced from Pyrograf Products, Inc. (Cedarville, OH) as highly graphitic and tubular stacked-cup carbon nanotubes. The remaining carbon-based nanomaterials were sourced from Cheap Tubes, Inc. (Grafton, VT). Both multiwalled carbon nanotubes and helical carbon nanotubes were produced through catalytic chemical vapour deposition. The helical carbon nanotubes contained 80 wt. % carbon nanotubes with a helical structure and various helix angles. Furthermore, chemically exfoliated graphene nanoplatelets were also considered, with a thickness of 8-15 nm. The specific surface area was highest for the graphene nanoplatelets (500-700 m$^2$/g) and lowest for the carbon nanofibers (20-30 m$^2$/g). Meanwhile, the reverse was true for the nanofiller length: the highest value was achieved with carbon nanofibers (150-200 μm), whereas the lowest was achieved with graphene nanoplatelets (1-2 μm). Table 1 lists the specific surface area, diameter, and length of each carbon-based nanofiller considered.

TABLE 1

Geometrical parameters of the carbon-based nanomaterials considered in this example.

| | Carbon nanofibers | Multi-walled carbon nanotubes | Helical carbon nanotubes | Graphene nanoplatelets |
|---|---|---|---|---|
| Specific surface area (m$^2$/g) | 20-30 | 110 | 30 | 500-700 |
| Diameter/ Thickness (nm) | 150 | 20-30 | 100-200 | 8-15 (thickness) |
| Length (μm) | 50-200 | 10-30 | 1-10 | 2 |

Cement nanocomposites were synthesized with 0.1-0.5 wt. % carbon-based nanomaterials per mass of cement. The detailed mix designs of all cement nanocomposites are provided in Table 2. In the rest of this example, the specimens were designated as X-n, where X=(GNP, CNF, HX, MWCNT) is the type of nanomaterial and n=(1, 2, 5) represents the mass fraction of nanomaterial (0.1*n wt. % per mass of cement).

TABLE 2

Mix design for cement nanocomposites.

| Specimen name | Nanomaterial fraction (%) | Nanomaterial mass (g) | Portland cement (g) | Deionized water (g) |
|---|---|---|---|---|
| Ref | 0 | 0 | 138.8 | 61.12 |
| X-1 | 0.1 | 0.138 | 138.8 | 61.12 |

TABLE 2-continued

Mix design for cement nanocomposites.

| Specimen name | Nanomaterial fraction (%) | Nanomaterial mass (g) | Portland cement (g) | Deionized water (g) |
|---|---|---|---|---|
| X-2 | 0.2 | 0.276 | 138.8 | 61.12 |
| X-5 | 0.5 | 0.69 | 138.8 | 61.12 |

X = CNF for carbon nanofiber-reinforced cement.
X = CNT for multiwalled carbon nanotube-reinforced cement.
X = HX for helical carbon nanotube-reinforced cement.
X = GNP for graphene-reinforced cement.

The novel synthesis protocol involved four steps. First, the carbon-based nanomaterials were pre-dispersed in deionized water with ultrasonic energy. A quadratic distribution of ultrasonic energy was adopted with respect to the nanomaterial mass fraction. The amount of ultrasonic energy provided was 1.77 kJ/(g/L) for 0.1 wt. %, 3.54 kJ/(g/L) for 0.2 wt. %, and 17.72 kJ/(g/L) for 0.5 wt. %. Second, the suspension of carbon-based nanomaterials in deionized water was mixed with Portland cement using an overhead IKA digital stirrer equipped with a four-bladed propeller stirrer to provide ultrahigh speed and high shear. The mixing speed was set at 200 rpm for nanomaterial fractions less than 0.1 wt. %, 400 rpm for 0.2 wt. %, and 800 rpm for 0.5 wt. %. Afterward, the slurry was poured into lubricated cylindrical moulds that were then sealed using polyethylene films. The specimens were initially cured for 24 hours using an orbital shaker at a rotational speed of 79 rpm. After the initial 24-hour curing, the cement nanocomposite specimens were removed from their moulds and soaked in deionized water for an additional six days. After a total of seven days of curing, the cement nanocomposites were soaked in ethanol for 24 hours to stop the cement hydration and stored under vacuum afterward.

Two reference Portland cement materials were mixed by combining 138.8 g of Portland cement with 61.12 g of deionized water. For the first reference Portland cement specimens, R-M, the Portland cement powder and deionized water were mixed manually for two minutes and cast in lubricated, sealed moulds to cure at room temperature for 24 hours. For the second reference Portland cement specimens, R-HS-OS, the cement powder was mixed with deionized water using an IKA digital overhead, high-shear, high-speed mixer at 200 rpm for two minutes. Afterward, the slurry was cast in lubricated moulds and sealed using an orbital shaker with a 19 mm orbit and rotational speed of 79 rpm for 24 hours. For both reference cement materials, R-M and R-HS-OS, after 24 hours of curing, the cement specimens were removed from their moulds and cured in deionized water for seven days.

Water Absorption and Porosity Measurements

Water absorption and porosity were measured after seven days of curing following standard ASTM C20-00 with minor modifications. (ASTM C20-00(2015)), Standard Test Methods for Apparent Porosity, Water Absorption, Apparent Specific Gravity, and Bulk Density of Burned Refractory Brick and Shapes by Boiling Water [Internet]. West Conshohocken (PA): ASTM International; 2015. Available from: www.astm.org/Standards/C20.htm.) First, the specimens were dried in an oven at 50° C. for 24 hours, and the dry mass $M_{dry}$ and dry specific gravity $\rho_{dry}$ were measured. Then, the specimens were saturated by submersion in deionized water at 23° C. for 24 hours, and the saturated mass $M_{saturated}$ was measured. The water absorption W was calculated as the relative difference between the dry and the saturated mass:

$$W = \frac{M_{saturated} - M_{dry}}{M_{dry}} \times 100 \quad (1)$$

The porosity P was computed as the product of the water absorption and the dry specific gravity (see, Théréné F. et al, Water absorption of recycled aggregates: measurements, influence of temperature and practical consequences. Cem. Concr. Res. 2020 Nov. 1; 137:106196-106204):

$$P = W \times \rho_{dry} \quad (2)$$

Grinding and Polishing

Before nanoscale mechanical testing, the cement nanocomposite specimens were meticulously polished to yield a flat surface. First, each specimen was cold-mounted using a low-viscosity epoxy resin. Afterward, 4 mm thick slices were machined using a low-speed diamond saw with an inert, oil-based coolant. Grinding was conducted using a semi-automated grinder and polisher apparatus, along with silicon carbide grinding pads of grit size 240, 400, and 600, consecutively. The specimens were rinsed using an ultrasonic bath with an inert, oil-based solvent in between each grit size. Polishing was conducted using abrasive lapping discs with silicon carbide particles of size 1 µm and 0.25 µm, consecutively. After grinding and polishing, the specimens were stored under vacuum.

Environmental Scanning Electron Microscopy Imaging

The microstructure of the polished cement nanocomposite specimens was observed using environmental scanning electron microscopy (ESEM) imaging. To this end, an FEI Quanta 650™ environmental scanning electron microscope equipped with a backscatter detector was used. In the ESEM experiments, the walking distance was 10-11 mm, the accelerating voltage was 10 kV, the spot size was 3-4.5, and the magnification level was in the range of 10,000× to 50,000×.

Scratch Tests

The fracture response of the cement nanocomposite specimens was measured using microscopic scratch tests. As illustrated schematically in FIG. 1A, scratch tests consisted of pushing an axisymmetric probe across the surface of a softer material under a linearly prescribed vertical force (Fv). All scratch tests were conducted using an Anton Paar (Ashland, VA) microscopic scratch tester equipped with a 200 µm Rockwell C diamond probe. The vertical force was progressively increased using a force feedback loop system, and the prescribed maximum vertical force was 2.5 N. Meanwhile, the scratch length was 5 mm, and the scratch speed was 10 mm/min. Before testing the cement specimens, the scratch probe was calibrated using fused silica. Calibration scratch tests were performed with a maximum vertical force of 7 N, a scratch length of 3 mm, and a scratch speed of 6 mm/min. During each scratch test, the vertical and horizontal forces were measured using load sensors with a resolution of 0.1 mN. The penetration depth was measured using a linear variable differential transformer system with a resolution of 0.3 nm. The acquisition rate for the forces and the vertical depth was 45.0 kHz. For each cement nanocomposite material, seven scratch tests were conducted, spaced 1.2 mm apart. The microscopic scratch tester unit was integrated with a high-resolution Nikon transmitted light microscope. At the end of each scratch test, optical microscopy images of the residual top surface were captured using an Olympus objective at 200× magnification, yielding a scratch panorama. After scratch testing, fracture micromechanisms were investigated using backscattered environmental scanning electron microscopy.

Theory

Figure 1C:
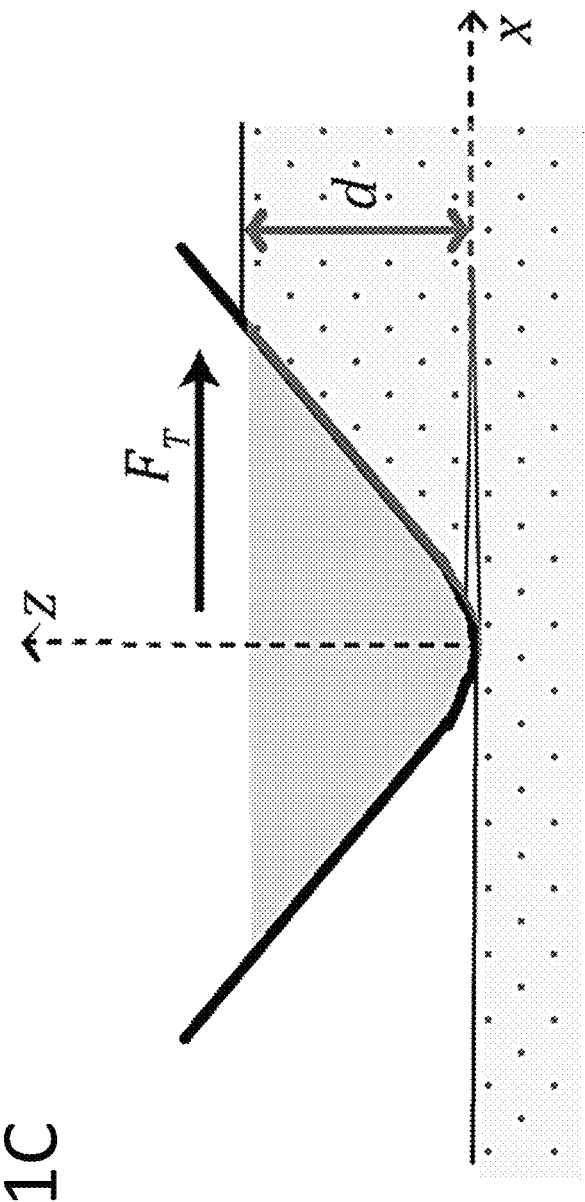
FIGS. 1C-1D show schematics illustrating the Fracture Mechanics model for scratch tests using an axisymmetric probe.

A nonlinear fracture mechanics model was applied to extract the fracture toughness from the scratch test measurements. The theoretical model was previously published in Akono et al., Scratching as a fracture process: from butter to steel. Phys. Rev. Lett. 2011 May 20; 106:204302-204305; Akono et al., Experimental determination of the fracture toughness via microscratch tests: application to polymers, ceramics, and metals. J. Mat. Res. 2011; 27 (2):485-493; and Akono et al., Fracture scaling relations for scratch tests of axisymmetric shape. J. Mech. Phys. Solids. 2012 Mar. 1; 60:379-390. The salient points are summarized here. The first step is to identify the shape of the fracture surface during scratch testing. To this end, backscattered environmental scanning electron microscopy imaging was performed to visualize the residual groove following progressive-load scratch tests on cold-rolled steel with a spheroconical probe (FIG. 1B, panels (i)-(ii)). Curved fracture surfaces were observed perpendicular to the direction of scratch testing. As for the orientation, the fracture surfaces were slanted, suggesting subsurface cracking. Based on these observations, the existence of a crack that propagates forward beneath the surface, away from the tip of the scratch probe, was postulated (FIG. 1C).

Figure 1D:
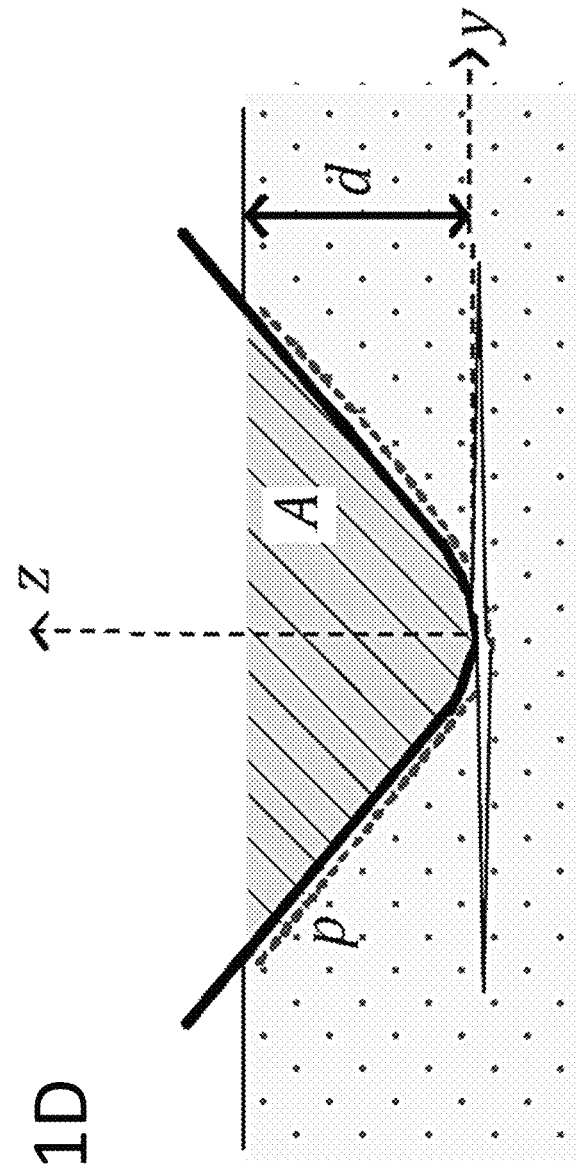

As drawn in FIG. 1D, the crack initiated below the crack tips and later followed the contour of the scratch probe. Consider a crack of length $\ell$ that propagates at a speed $\underline{V} = \dot{\ell}\,\underline{e}_x$. Given penetration depth d, there are two geometrical parameters of interest: the perimeter p (the dotted line in FIG. 1D) and the horizontally projected load-bearing contact area A (the hatched area in FIG. 1D). During an incremental advance $d\ell$ of the crack, the incremental crack surface created is $d\Gamma = p\,d\ell$. The energy release rate G is the thermodynamic driving force associated with crack propagation. The dissipation during crack propagation is $dD = G\,d\Gamma$. The energy release G is then related to the rate of change of the potential energy $\varepsilon_{pot}$ via:

$$\frac{d\varepsilon_{pot}}{dt} = -G\dot{\Gamma} = -Gp\dot{\ell} \tag{3}$$

The energy release rate G is calculated using the contour integral method or J-integral. (Rice J R. J. Appl. Mech. 1968; 35 (2):379-386.) The basic idea is to describe the change in potential energy within a material volume $\Omega$ from the perspective of an observer tied to the tip of the propagating crack. Consider a closed contour C containing the crack tip. For a displacement-prescribed test, and given the stress-free boundary conditions on the crack faces, the potential energy is the integral of the free energy inside the material volume $\Omega$, or $\varepsilon_{pot} = \int_\Omega \psi\,d\Omega$. The total change in potential energy comprises two terms. The first term, $$\int_\Omega \frac{\partial \psi}{\partial t} d\Omega,$$

is related to the change in free energy within $\Omega$. The second term, $\int_{\partial\Omega} -\psi \underline{V}\cdot\underline{n}$, describes the free energy convectively transported as the reference system moves at speed $\underline{V}$ (the observer is fixed and tied to the crack tip) where $\underline{n}$ is the outward unit vector normal to the boundary $\partial\Omega$ of $\Omega$. Thus:

$$\frac{d\varepsilon_{pot}}{dt} = \int_\Omega \frac{\partial \psi}{\partial t} d\Omega - \int_{\partial\Omega} \psi\underline{V}\cdot\underline{n} = -Gp\dot{\ell} \tag{4}$$

For a linear elastic material, $$\psi = \frac{1}{2}\underline{\underline{\sigma}}:\underline{\underline{\varepsilon}}.$$

Using the theorem of virtual work, the first term can be transformed into $$\int_\Omega \frac{\partial \psi}{\partial t} d\Omega = \dot{\ell}\int_{\partial\Omega} \underline{T}\cdot\frac{\partial \underline{\xi}}{\partial x}dS,$$

where $\underline{T} = \underline{\underline{\sigma}}\cdot\underline{n}$ is the stress vector on the boundary $\partial\Omega$ and $\underline{\xi}$ is the displacement vector. Finally, the integral on the boundary of the material volume element can be simplified into an integral on the closed contour C, since the crack surface is stress-free ($\underline{T}=\underline{0}$) and horizontal ($\underline{e}_x\cdot\underline{n}=0$). Therefore, the energy release rate can be estimated from:

$$G = \frac{1}{p}\int_C \left(\psi n_x - \underline{T}\cdot\frac{\partial \underline{\xi}}{\partial x}\right)dS \tag{5}$$

with $n_x = \underline{e}_x\cdot\underline{n}$. In the case of the scratch test, the closed contour comprises the material probe interface (S), the top surface that is stress-free ($n_x=0$, $\underline{T}=\underline{0}$), and closing material surfaces far removed $$\left(\psi = 0,\ \frac{\partial \underline{\xi}}{\partial x} = \underline{0}\right).$$

As a result, the only non-zero contribution to the right-hand side of Eq. (3) comes from the material-probe interface:

$$G = \frac{1}{p}\int_{(S)} \left(\psi n_x - \underline{T}\cdot\frac{\partial \underline{\xi}}{\partial x}\right)dS \tag{6}$$

Assuming plane strain conditions, along with a uniaxial distribution of the stress field ahead of the probe, $$\underline{\underline{\sigma}} = -\frac{F_T}{A}\underline{e}_x \otimes \underline{e}_x,$$

the energy release rate G can be expressed as a function of the horizontal force $F_T$, the material Young's modulus E, and the Poisson's ratio $\nu$ according to:

$$G = \frac{1-\nu^2}{E}\frac{F_T^2}{2pA} \tag{7}$$

The Griffith crack propagation criterion is employed to mark the onset of crack propagation. The crack propagates when the energy release rate G reaches a certain threshold, that is, the fracture energy $G_f$. (Griffith A A. Phil. Trans. R. Soc. A. 1921; 221 (582-593):582-593.) The Griffith-Irwin relation is utilized to connect the fracture energy $G_f$ to the fracture toughness $K_c$, assuming plane strain conditions $$G = \frac{1-v^2}{E} K_c^2.$$

(Barenblatt G I. Adv. Appl. Mech. 1962; 7 (1):55-129.) The fracture toughness $K_c$ is then a function of the horizontal force $F_T$ according to:

$$K_c = \frac{F_T}{\sqrt{2pA}} \qquad (8)$$

Herein, 2 pA is the scratch probe shape function that depends on the penetration depth d and on the scratch probe geometry. For instance, for a conical probe, the scratch probe shape function is a cubic function of the penetration depth, whereas for a spherical probe, the scratch probe shape function is a quadratic function of the penetration depth. In practice, the scratch probe shape function must be calibrated using a reference material. (Akono A T, Ulm F J. Wear. 2014; 313 (1-2):117-124.) The theoretical model then predicts that, in the case of a purely brittle fracture process, the ratio of the horizontal force over the square root of the scratch probe shape function is constant and equal to the fracture toughness of the material.

Results

Microstructure of Cement Nanocomposites

Figure 7:
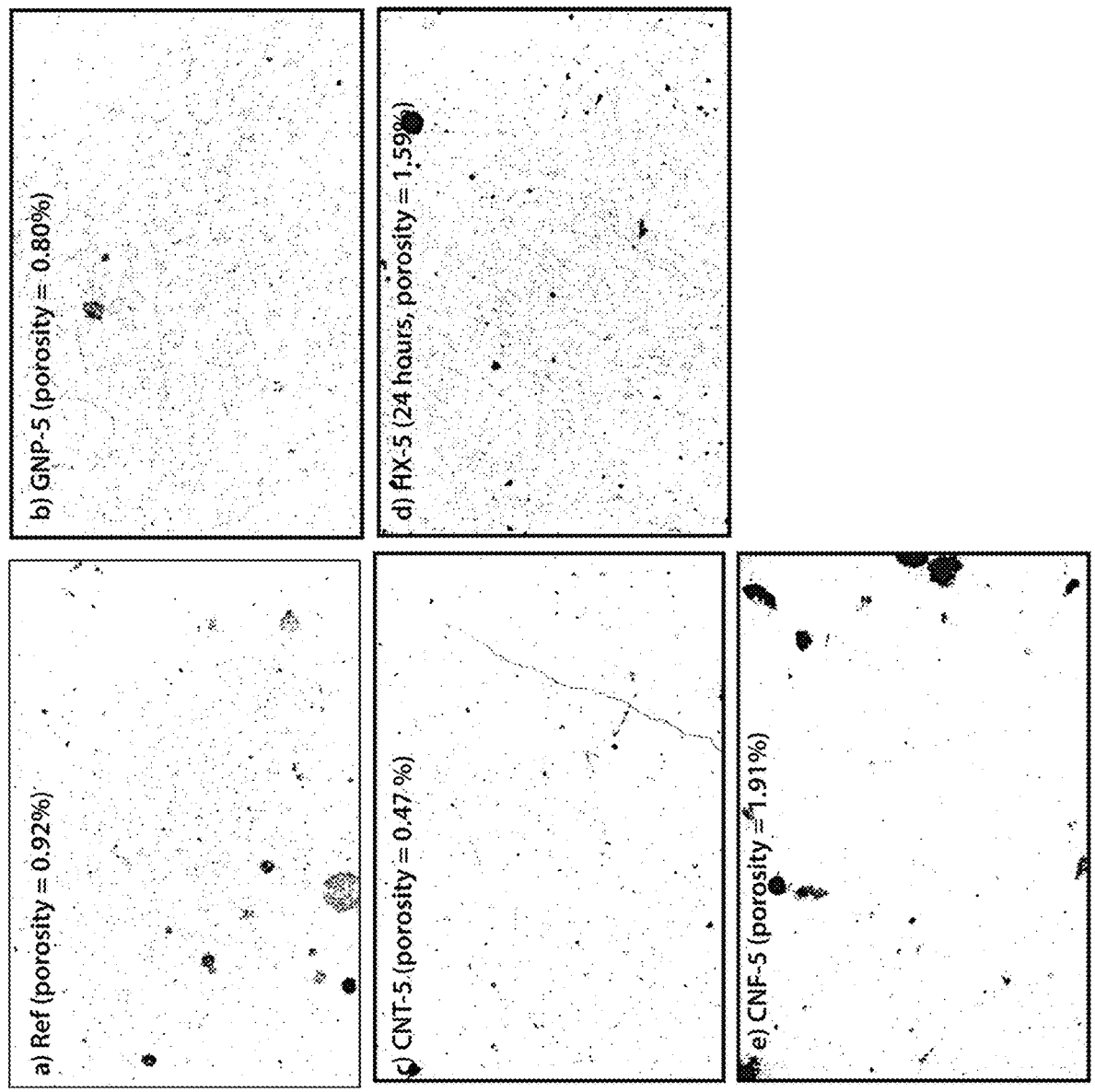
FIG. 7, panels (a)-(e), shows segmented BESEM images of plain cement and cement nanocomposites at a ×55 magnification level. Except otherwise noted, all specimens were imaged after 7 days of hydration.

Using environmental scanning electron microscopy, a granular and porous microstructure was observed, with unhydrated cement grains in white, hydrated cement in grey, and micropores in black (FIG. 7, panels (a)-(e)). FIGS. 2A-2D display high-resolution BESEM images of nano-reinforced cement at a mass fraction of 0.5 wt. %, with magnification levels ranging between 5,000× and 50,671×. For graphene-reinforced cement (FIGS. 2A-2B), flakes of graphene nanoplatelets were observed connecting cement hydration products—here, calcium silicate hydrate (C-S-H) grains and ettringite needles. For carbon nanofiber-reinforced cement, FIG. 2C shows single carbon nanofibers, 110-240 nm thick, filling nanopores. BESEM imaging suggests that the dispersion procedure was sufficient to debulk carbon nanofibers and yield isolated carbon nanofibers within Portland cement matrices. As for multiwalled carbon nanotube-reinforced cement, FIG. 2D shows carbon nanotube bundles, 145-365 nm thick, filling nanopores and connecting C-S-H grains. Thus, nanomaterials refined the pore structure at the nanoscale by filling voids and connecting cement hydration products.

Figure 8A:
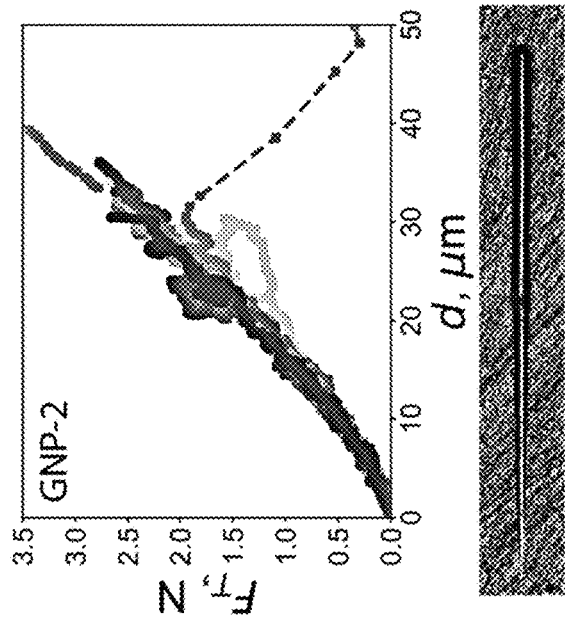
FIGS. 8A-8L show load-depth curves for cement nanocomposites. $F_T$ is the horizontal force recorded during scratch testing, and d is the penetration depth. N=7 tests were conducted per specimen. Below each specimen, a representative optical microscopy image of the residual groove after scratch testing is shown.
Figure 8B:
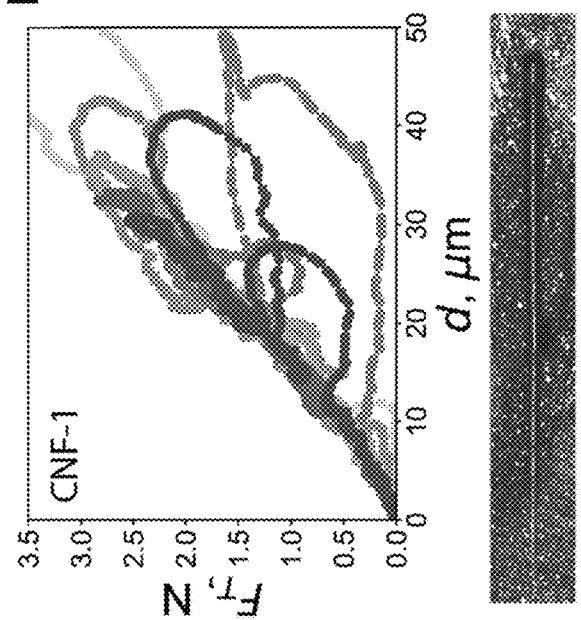
Figure 8C:
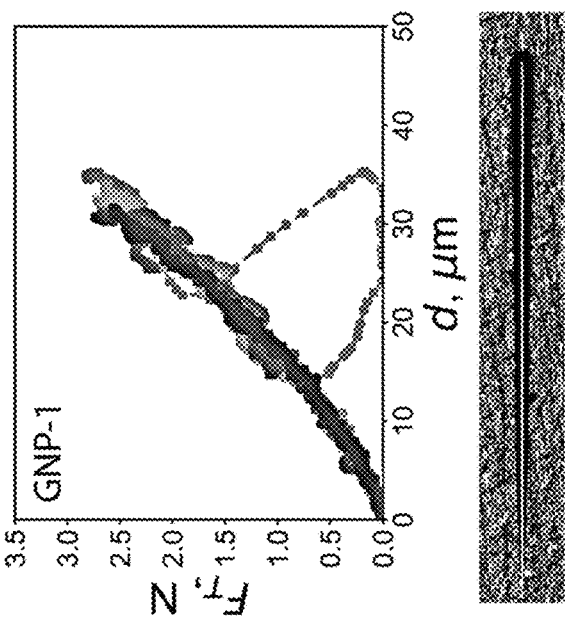
Figure 8D:
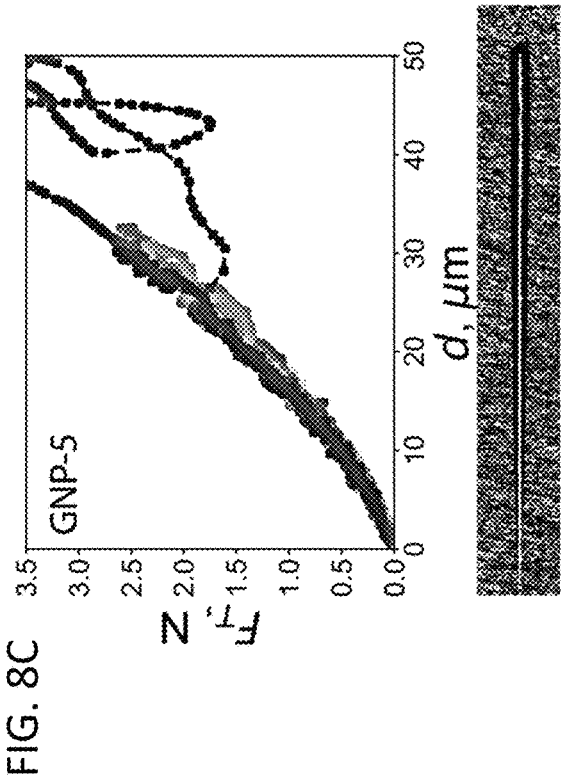
Figures 8E, 8F:
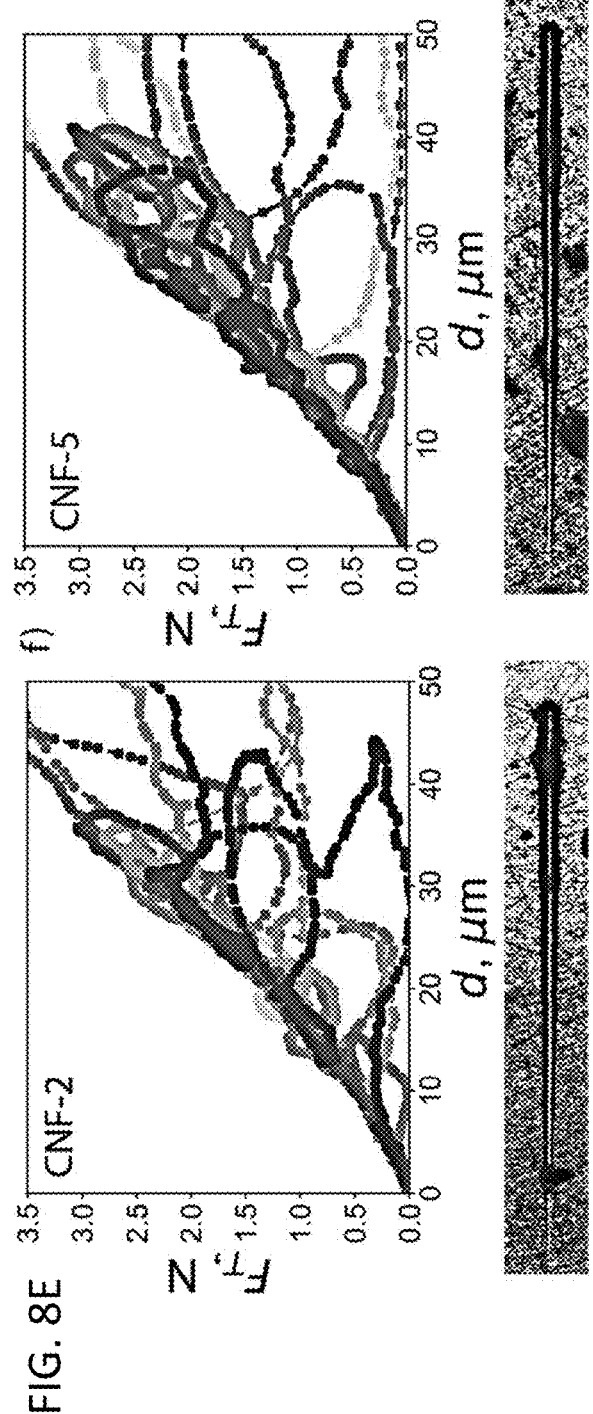
Figures 8G, 8H:
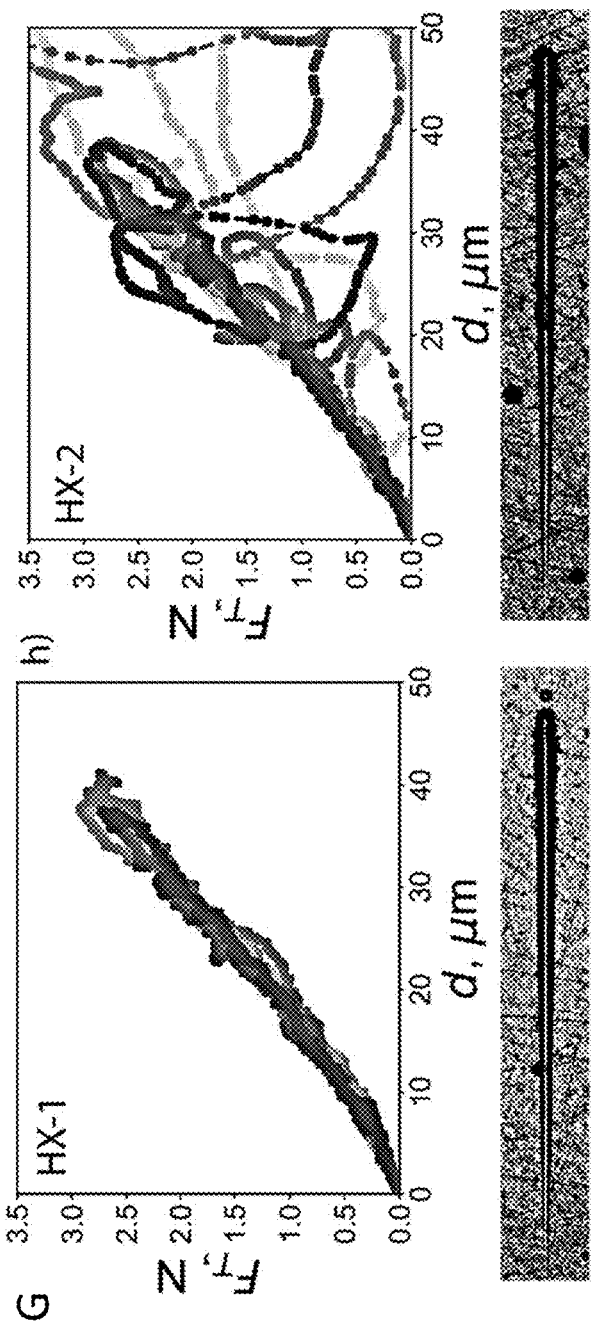
Figure 8I:
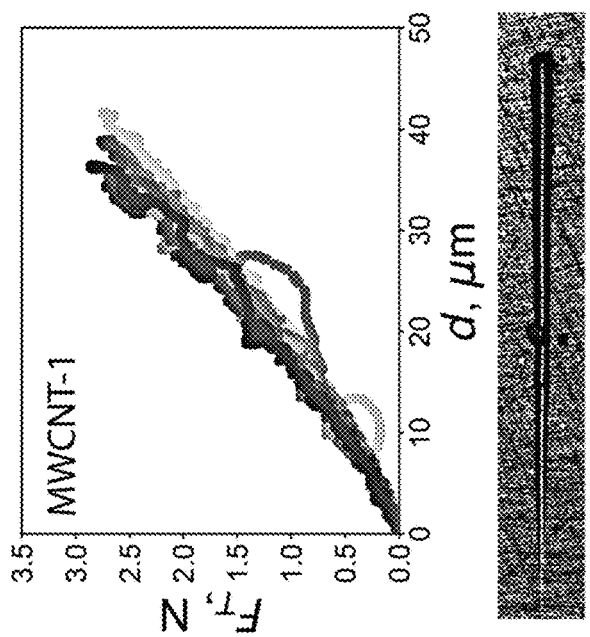
Figure 8J:
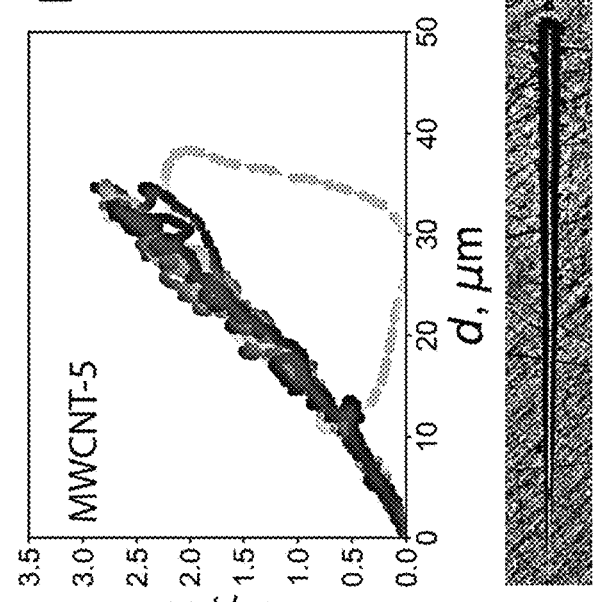
Figure 8K:
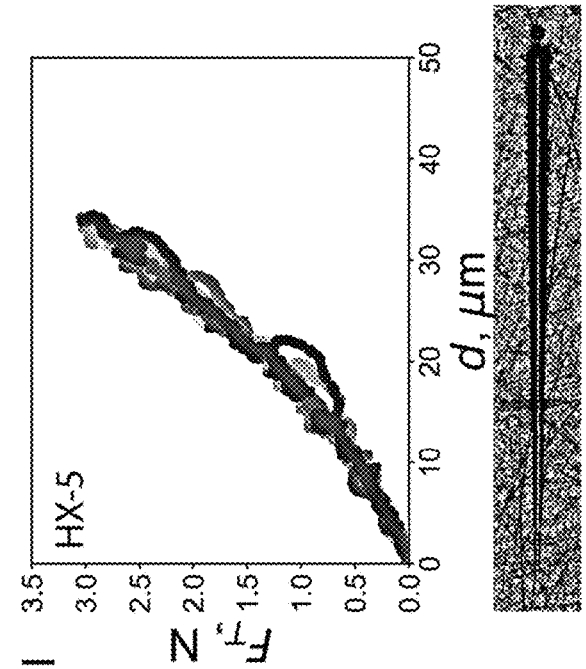
Figure 8L:
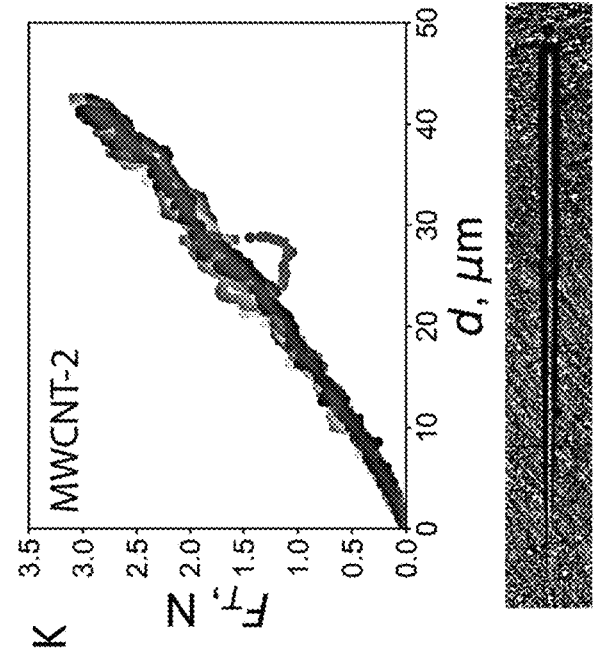
Figure 9A:
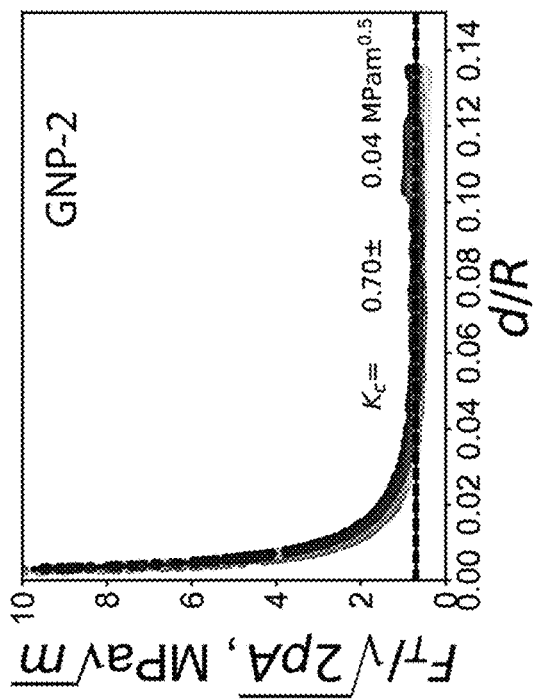
FIGS. 9A-9L show fracture scaling for cement nanocomposites. $F_T$ is the horizontal force recorded during scratch testing, and d is the penetration depth. R is the scratch probe tip radius and 2 pA is the scratch probe shape area function.
Figure 9B:
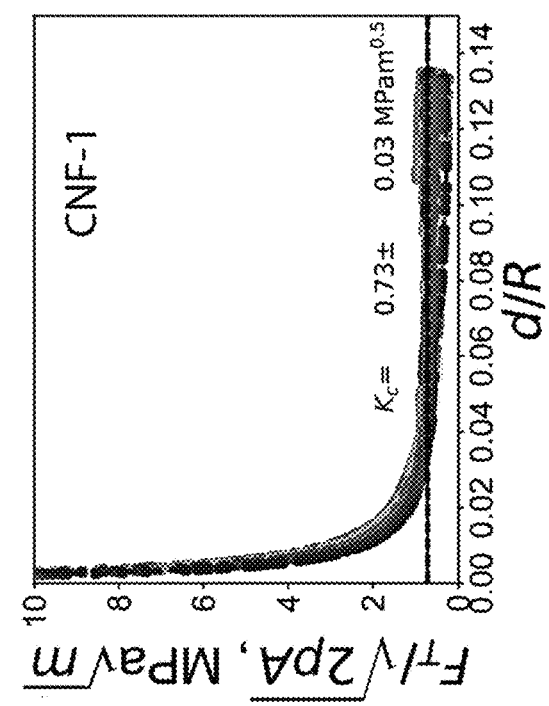
Figure 9C:
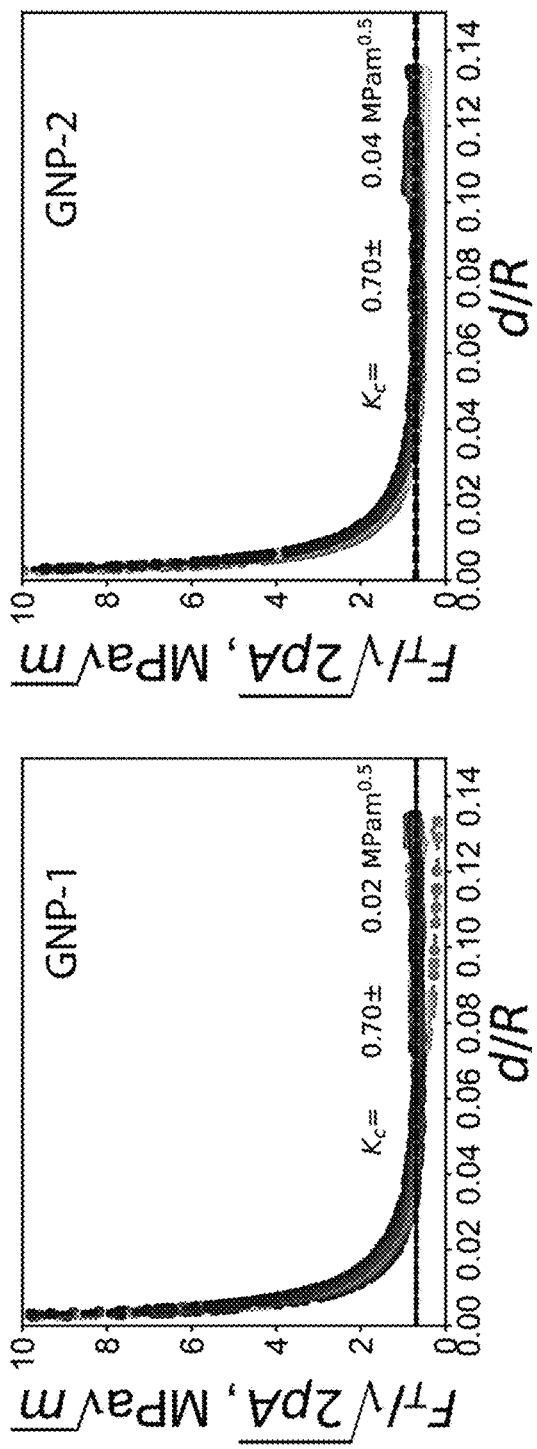
Figure 9D:
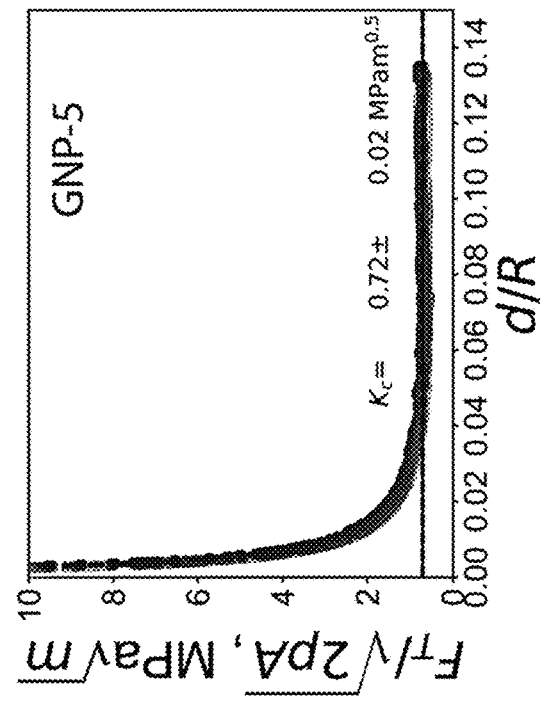
Figures 9E, 9F:
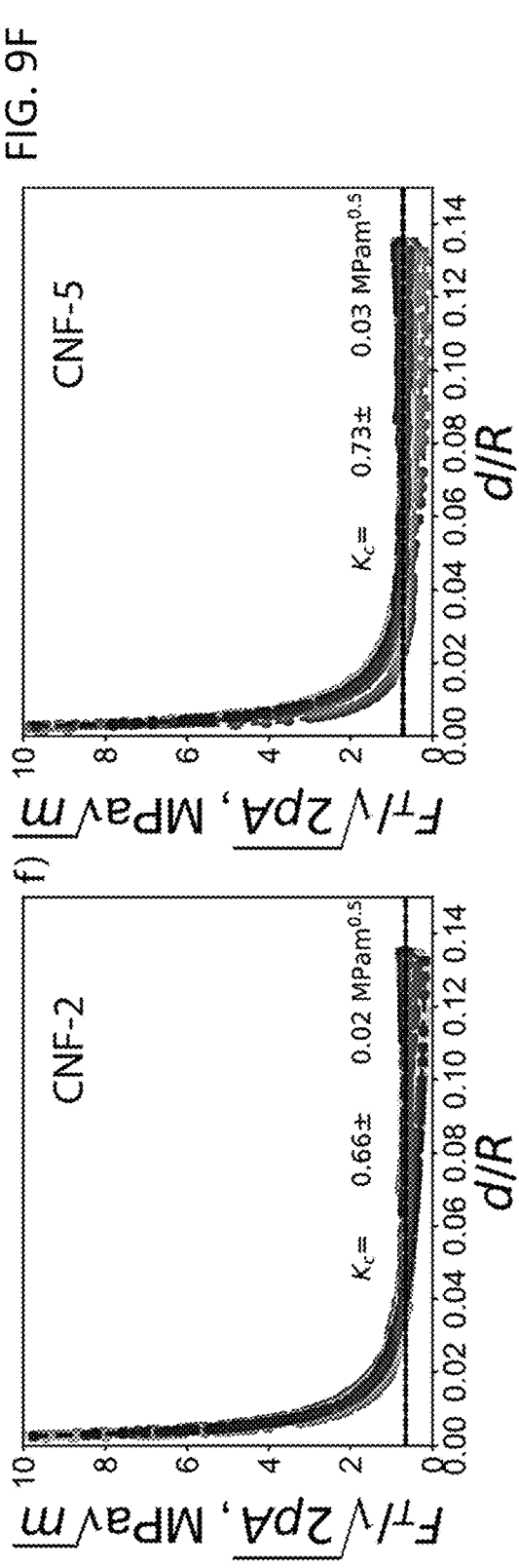
Figures 9G, 9H:
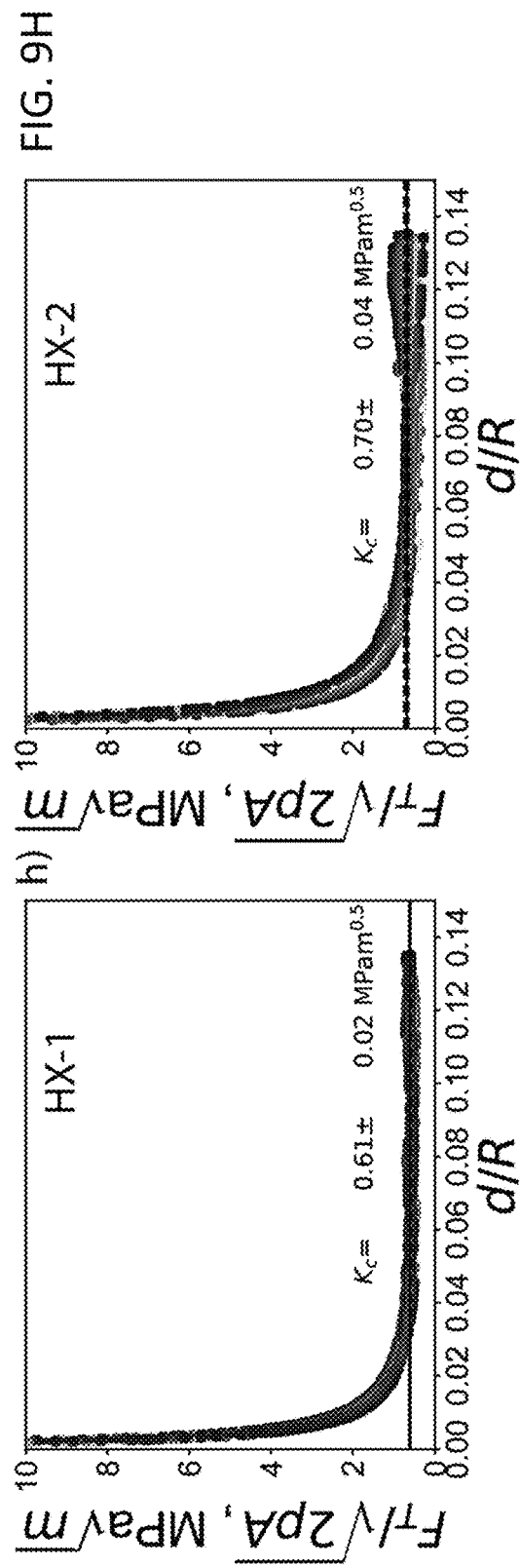
Figure 9J:
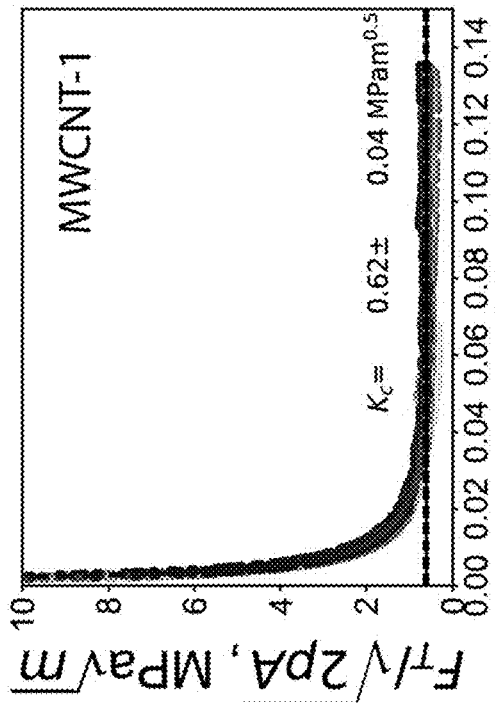
Figure 9L:
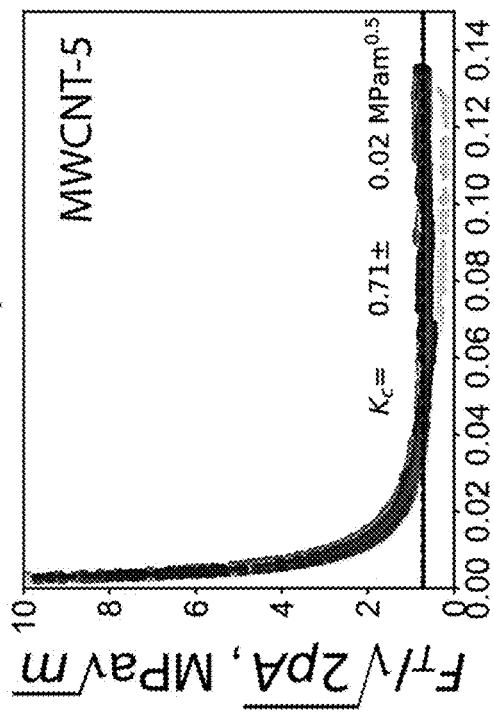
Figure 9I:
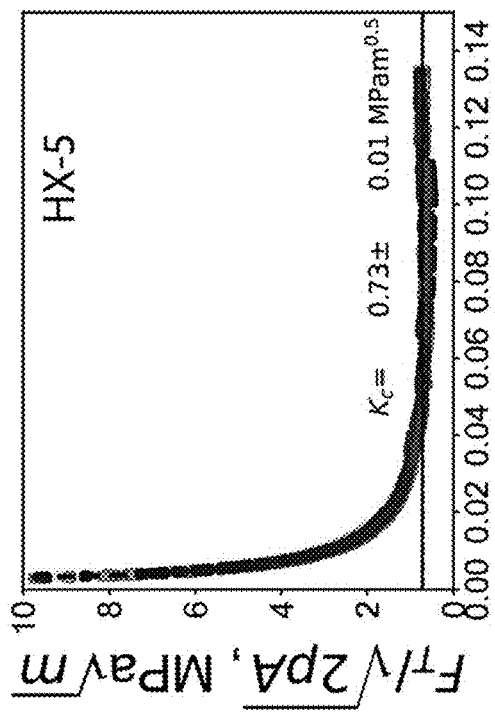
Figure 9K:
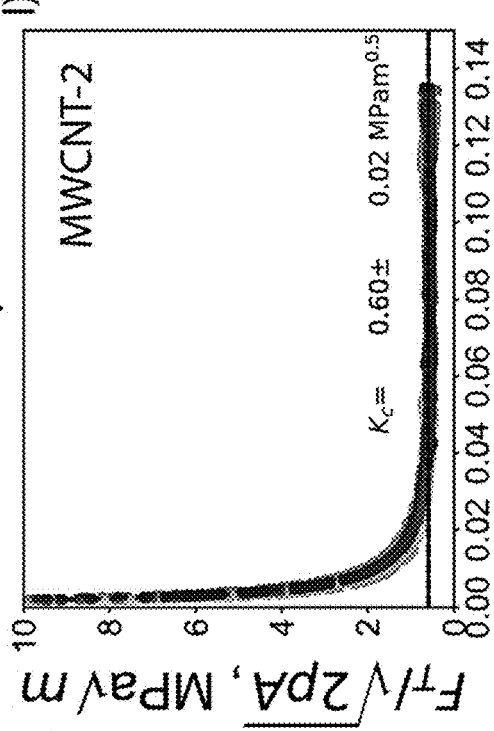
Figure 10A:
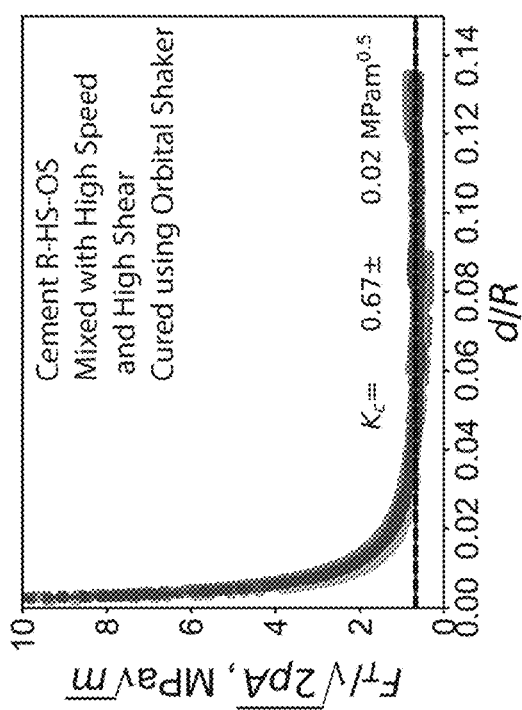
FIGS. 10A-10B show reference Cement R-M that was manually mixed.
Figure 10B:
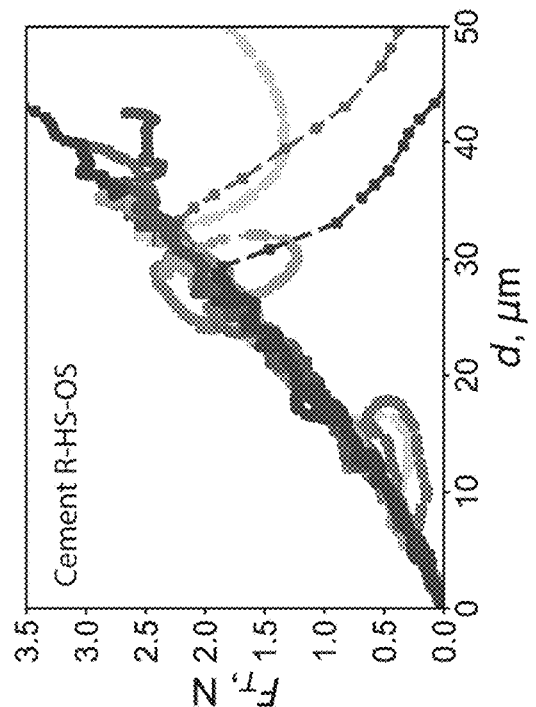
Figure 10C:
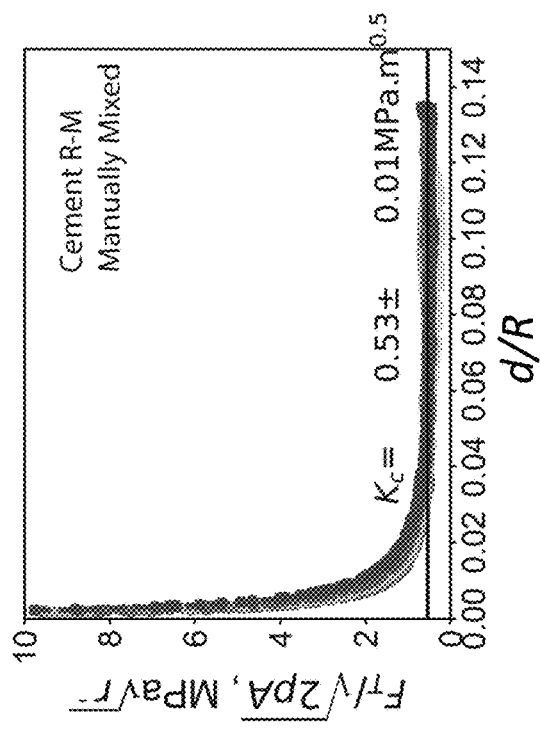
FIGS. 10C-10D show reference cement R-HS-OS that was mixed using high shear and high speed and cured using on orbital shaker for the first 24 hours of curing age.
Figure 10D:
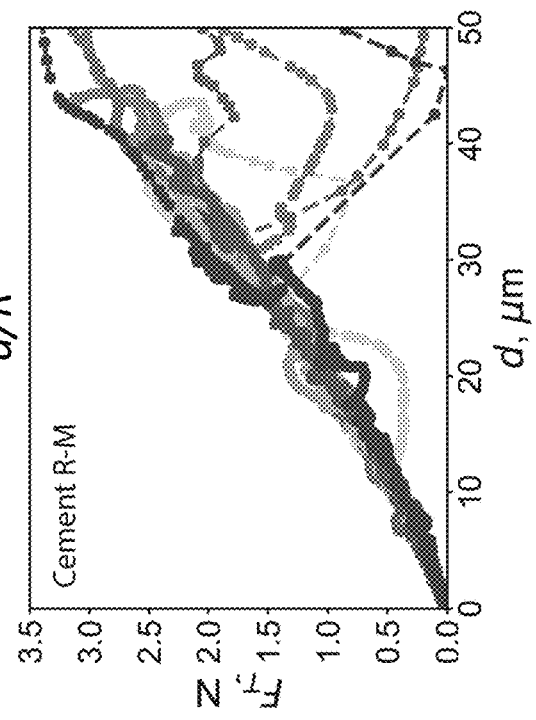
Figure 11A:
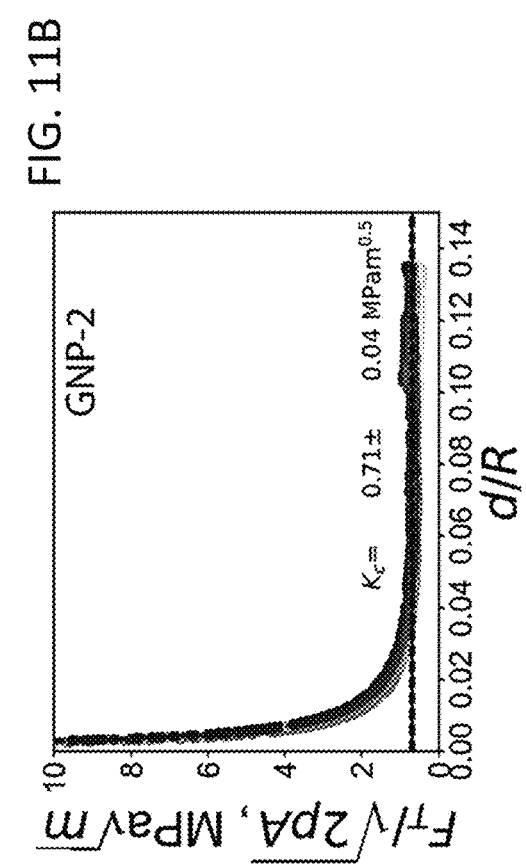
FIGS. 11A-11L show fracture scaling for cement nanocomposites. $F_T$ is the horizontal force recorded during scratch testing, and d is the penetration depth. R is the scratch probe tip radius and 2 pA is the scratch probe shape area function.
Figure 11B:
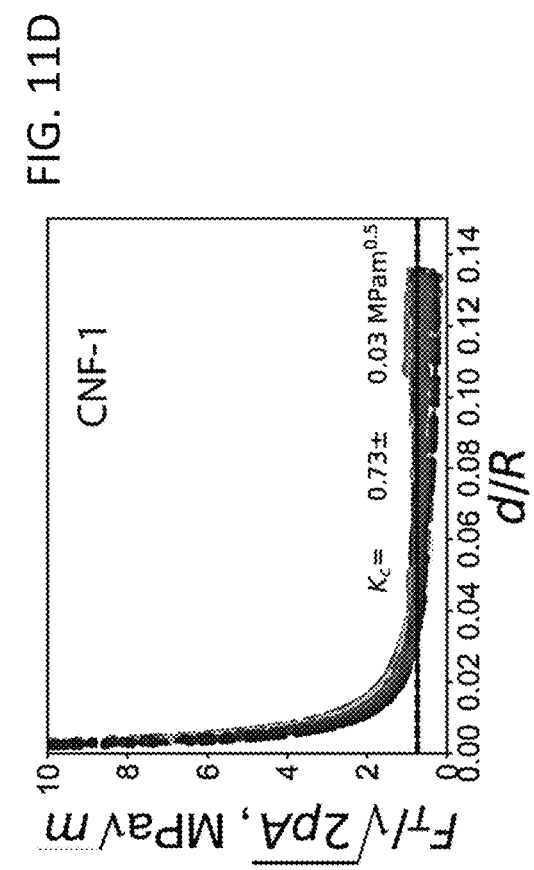
Figure 11C:
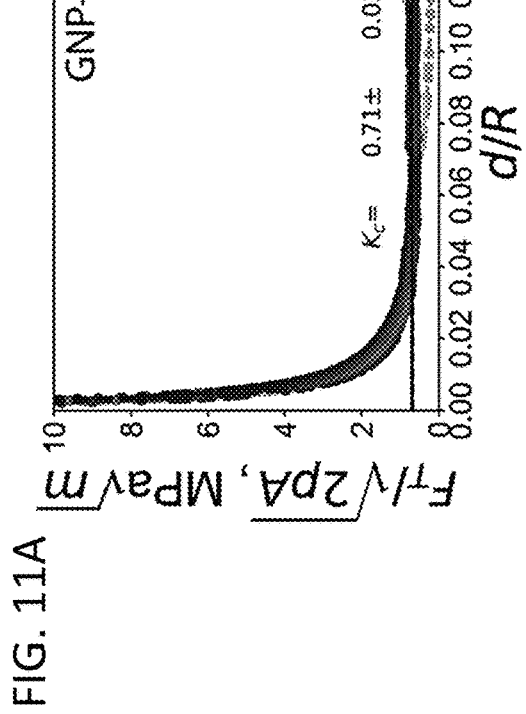
Figure 11D:
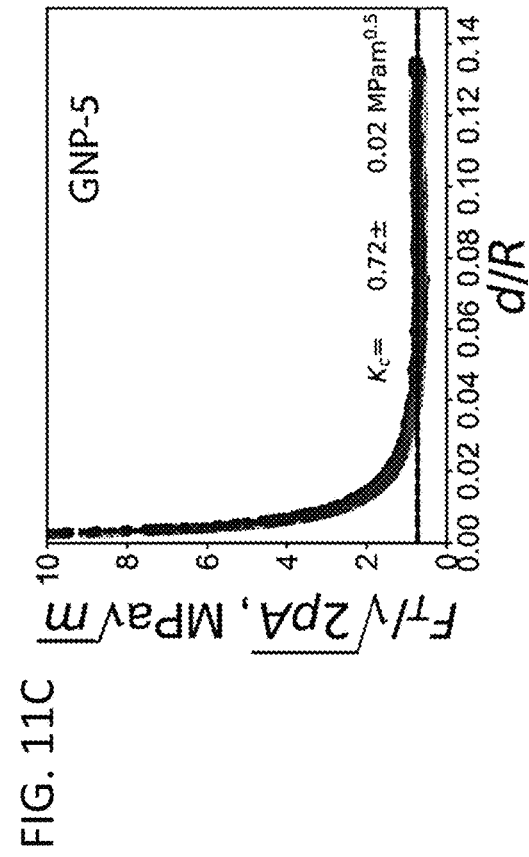
Figure 11E:
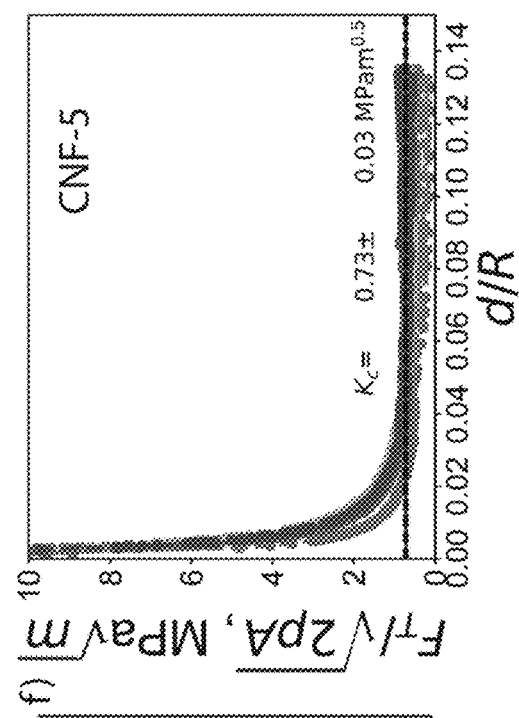
Figure 11F:
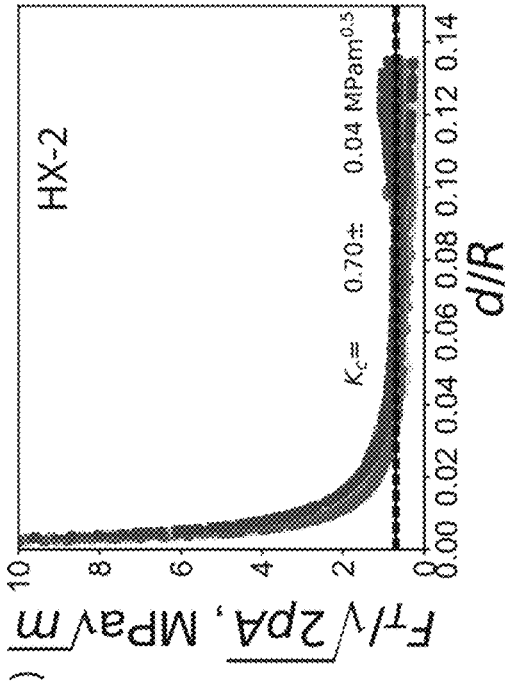
Figure 11G:
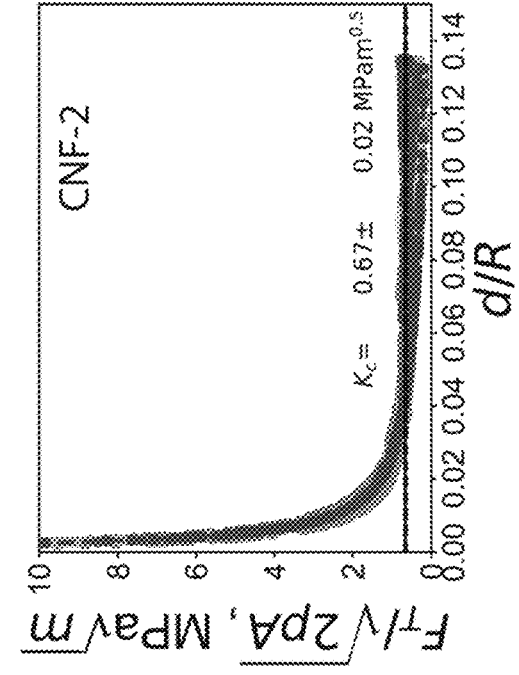
Figure 11H:
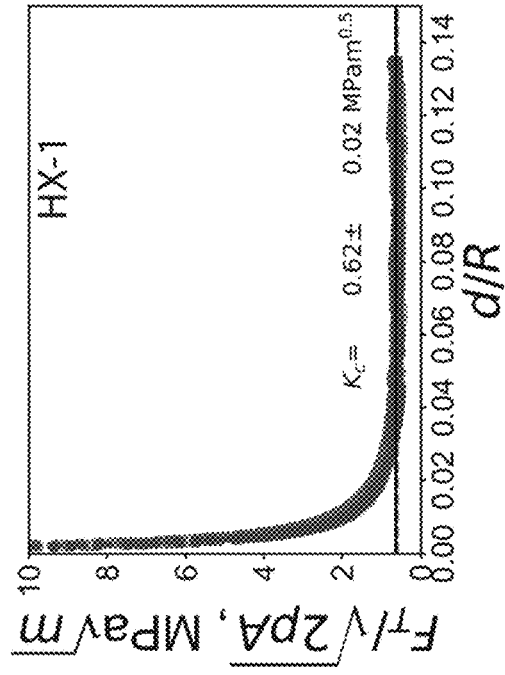
Figure 11I:
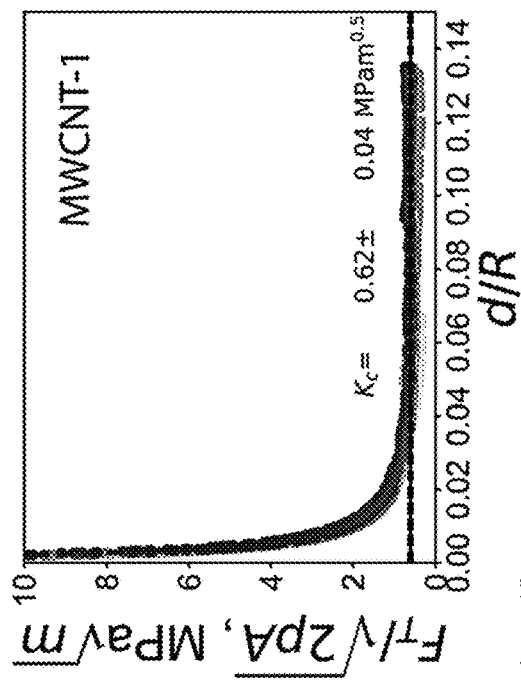
Figure 11J:
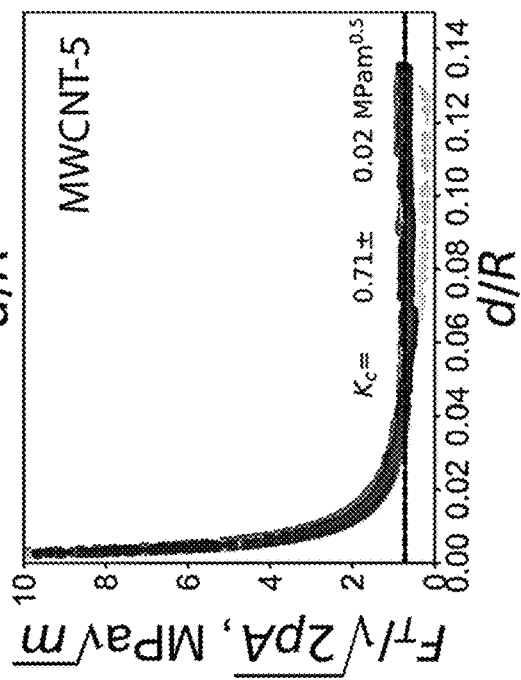
Figure 11K:
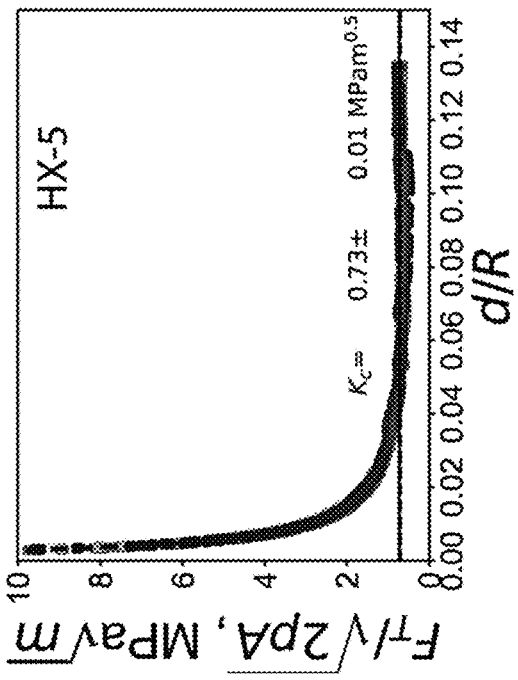
Figure 11L:
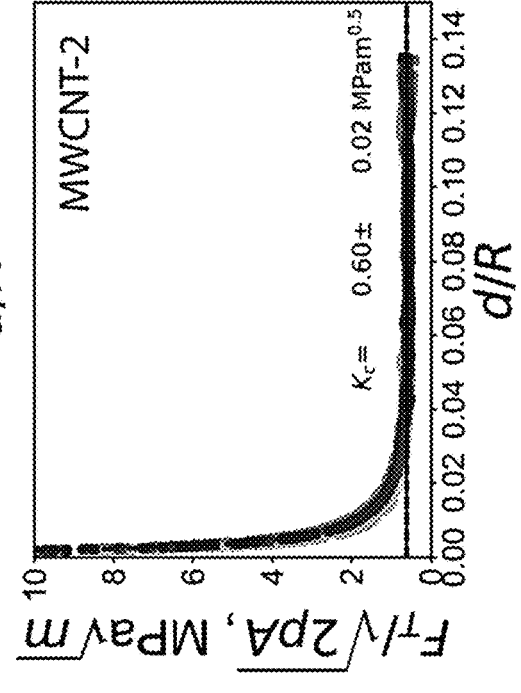

This novel procedure for synthesizing cement nanocomposites yielded an increase in water penetration resistance, as measured via water absorption and porosity. The water absorption and porosity values for the reference cement and cement nanocomposite specimens are reported in FIGS. 8A and 8B, respectively. The nominal values of water absorption, porosity, and dry specific gravity are given in Table 3. The water absorption of the manually mixed Portland cement reference specimen was 16.83%, with a porosity of 29.76%. Significant decreases in both water absorption and porosity were observed for the Portland cement reference specimen following high-speed, high-shear mixing combined with curing on an orbital shaker: Water absorption was 5.07% and porosity was 9.64%. A greater decrease was observed for cement nanocomposites, with median water absorption and porosity values of 3.65% and 7.17%, respectively. The lowest water absorption and porosity values were obtained for GNP-5: 2.52% and 4.81%, respectively. After testing cement reinforced with 0.05-0.1 wt. % carbon nanotubes, the volume fraction of pores greater than 100 nm was 3%-5%. Therefore, 24-hour curing on an orbital shaker removed macroscopic air voids, densified the microstructure, and reduced water absorption. Carbon-based nanomaterials also promoted the densification of the microstructure and led to an improvement in water penetration resistance, as measured by water absorption and porosity.

TABLE 3

Dry specific gravity, water absorption, and porosity for reference cement and cement nanocomposite specimens.

| Specimen name | Dry specific gravity | Water Absorption (%) | Porosity (%) |
|---|---|---|---|
| Reference Cement R-M | 1.77 | 16.83 | 29.75 |
| Reference Cement R-HS-OS | 1.90 | 5.07 | 9.64 |
| MWCNT-1 | 1.88 | 3.51 | 6.60 |
| MWCNT-2 | 2.01 | 3.70 | 7.43 |
| MWCNT-5 | 2.03 | 3.17 | 6.44 |
| CNF-1 | 1.93 | 3.90 | 7.54 |
| CNF-2 | 2.05 | 5.66 | 11.62 |
| CNF-5 | 1.87 | 4.12 | 7.73 |
| GNP-1 | 2.02 | 3.44 | 6.96 |
| GNP-2 | 1.96 | 2.71 | 5.33 |
| GNP-5 | 1.91 | 2.51 | 4.81 |
| HX-1 | 2.05 | 3.91 | 7.99 |
| HX-2 | 1.88 | 3.78 | 7.10 |
| HX-5 | 2.01 | 3.60 | 7.23 |

X = CNF for carbon nanofiber-reinforced cement.
X = CNT for multiwalled carbon nanotube-reinforced cement.
X = HX for helical carbon nanotube-reinforced cement.
X = GNP for graphene-reinforced cement.
R-M = manually mixed Portland cement specimen.
R-HS-OS - Portland cement specimen mixed using high shear and high speed and cured for the first 24 hours using an orbital shaker.

Fracture Micromechanisms of Cement Nanocomposites

Figures 3A, 3B, 3C, 3D:
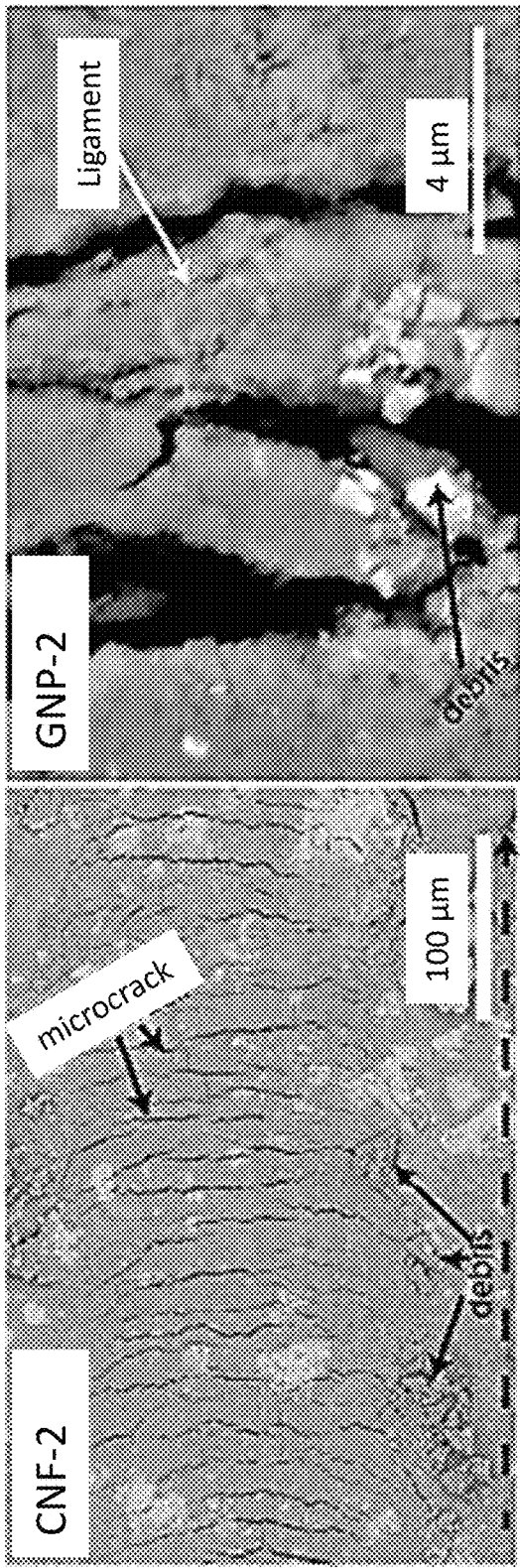
FIGS. 3A-3D show fracture mechanisms of cement nanocomposites.

FIG. 3A displays a BESEM image of the residual groove after scratch testing on carbon nanofiber-reinforced cement. Microcracks were observed that were curved and perpendicular to the direction of the motion of the scratch probe. There was also some debris present on the sides of the grooves. The microcracks and debris provided physical evidence of fracture processes during scratch testing and justified the use of the scratch test method to yield fracture toughness. FIGS. 3B-3D display fracture micromechanisms for cement nanocomposites. In addition to microcracking and debris generation, additional fracture micromechanisms include ligament bridging and crack deflection.

Fracture Toughness of Cement Nanocomposites

Figure 4A:
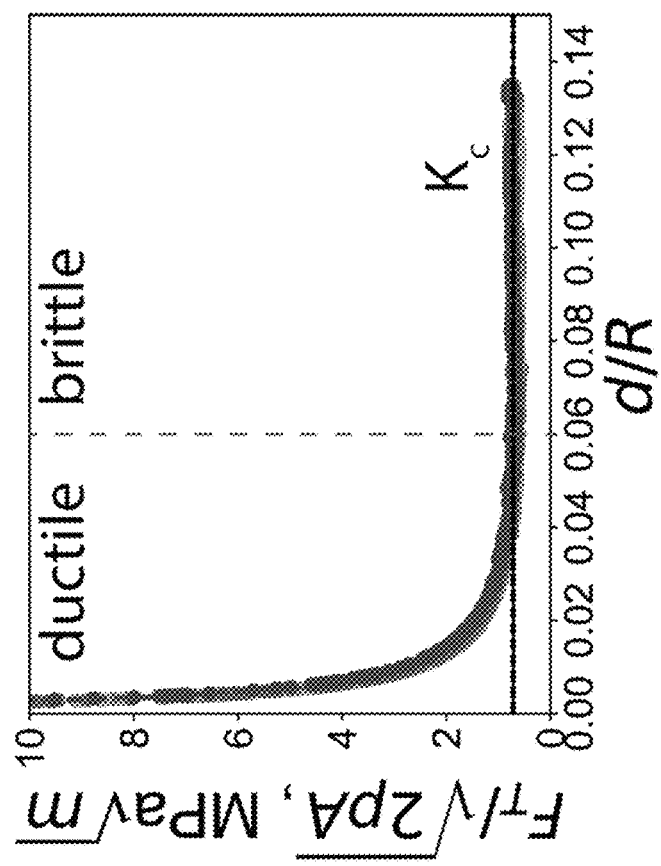
FIGS. 4A-4C show fracture toughness of graphene-cement GNP-5.

FIG. 4A displays representative load-depth curves for cement nanocomposites, using graphene cement GNP-5 as an example. Seven scratch tests were conducted, spaced 1.2 mm apart. All seven tests look similar when superimposed on top of each other, pointing to the reproducibility of the scratch test method. For all but one test, the maximum penetration depth was approximately 32 µm, whereas the maximum value of the horizontal force was around 2.5 N. After each scratch test, a residual groove was formed (FIG.

4B). The presence of the residual groove, along with the observed crack surfaces support the approach to measuring fracture toughness using scratch testing. FIGS. 8A-8L display the load-depth curves for all cement nanocomposite specimens tested.

Figure 4C:
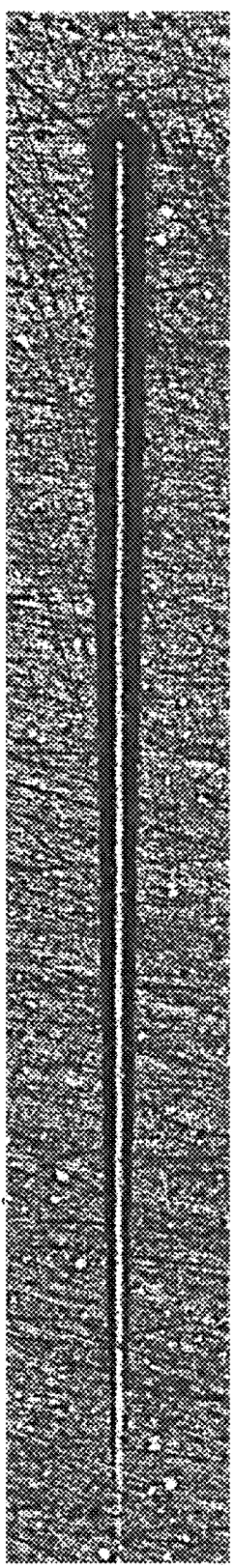
Figure 4B:
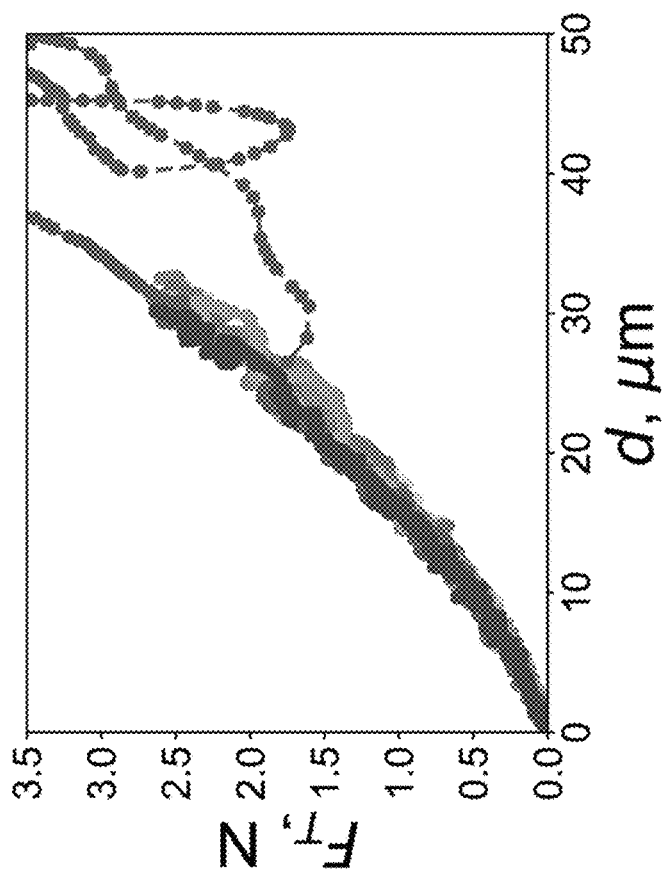
Figure 5A:
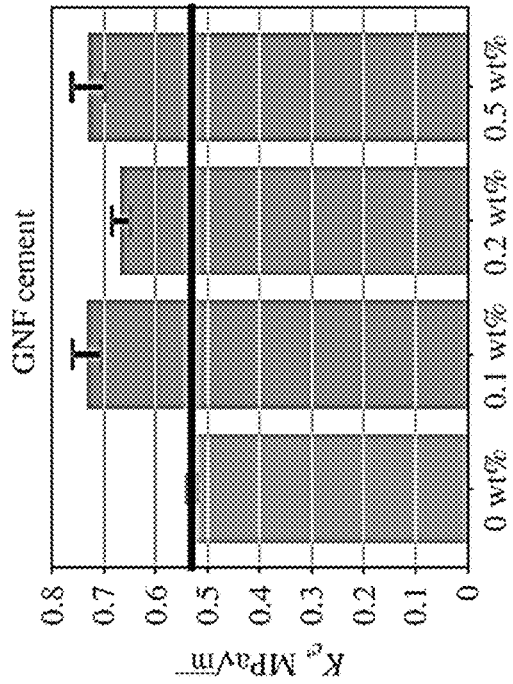
FIGS. 5A-5D show the influence of carbon-based nanomaterials on the fracture toughness of cement matrices. GNP=graphene nanoplatelets. CNF=carbon nanofibers. HX=helical carbon nanotubes. MWCNT=multiwalled carbon nanotubes. A line indicates the average fracture toughness of the reference Portland cement specimen.
Figure 5B:
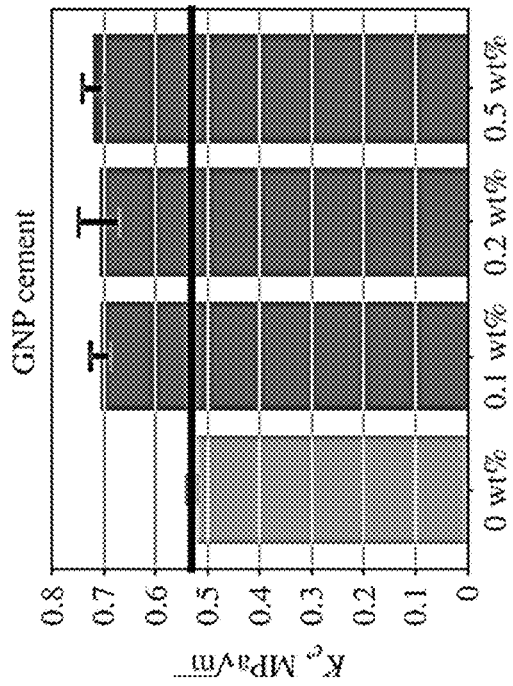
Figure 5C:
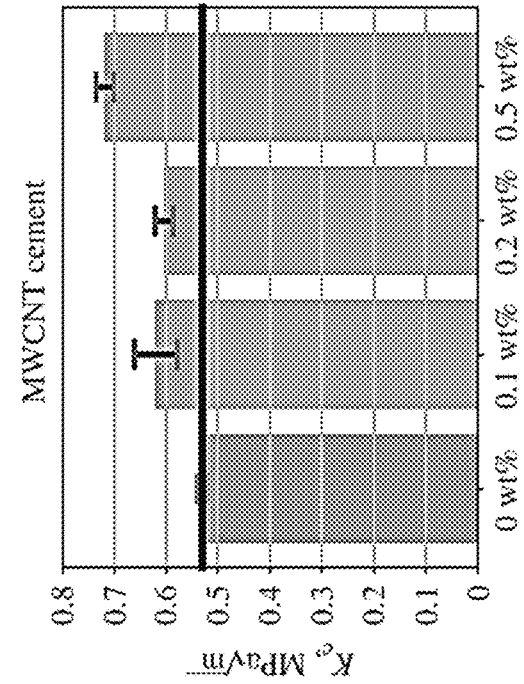
Figure 5D:
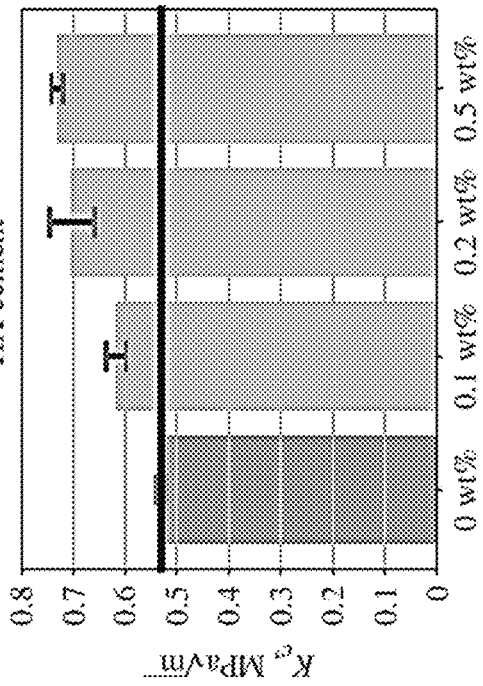

FIG. 4C displays the fracture scaling of scratch tests using the nonlinear fracture mechanics model. The quantity $$\frac{F_T}{\sqrt{2pA}}$$

is displayed as a function of the depth-to-radius ratio $$\frac{d}{R}.$$

A Rockwell C scratch probe was used, which consists of a cone of half-apex angle 60° with a sphere of tip radius R=200 µm at the end. In particular, the transition from sphere to cone occurs at a penetration depth of $d_0$=27 µm. Thus, given the penetration depths recorded, the shape function for a spherical probe was used and only data points corresponding to d≤$d_0$ were considered. According to the theoretical model (Eq. 6), the quantity $$\frac{F_T}{\sqrt{2pA}}$$

is constant in the case of a brittle fracture process. FIG. 4C shows two regions: For $$\frac{d}{R} \leq 0.06,$$

the quantity $$\frac{F_T}{\sqrt{2pA}}$$

decreased sharply, pointing to a mix of ductile and brittle failure processes. However, for $$\frac{d}{R} > 0.06,$$

a convergence towards a constant value was observed. The convergence of $$\frac{F_T}{\sqrt{2pA}}$$

points to a fracture-driven process with dominant brittle fracture; fracture toughness is also the asymptotic value of $$\frac{F_T}{\sqrt{2pA}}.$$

Before the test, the scratch probe shape function 2 pA was calibrated using fused silica; the calibration curve is shown in FIGS. 9A-9L. (Akono A T, et al., J. Mat. Res. 2011; 27 (2):485-493.) Using scratch tests, the fracture toughness of the reference Portland cement specimen R-M was found to be equal to 0.531±0.006 MPa√m. This value agrees with reported values of the fracture toughness for plain Portland cement (w/c=0.4, 0.4-0.5 MPa√m) using conventional macroscopic fracture testing methods, such as the three-point bending test on single-edge notched specimens. (Brown J H et al., Cem. Concr. Res. 1973; 3 (4):475-80; Mindess S et al., Cem. Concr. Res. 1984; 4 (6):953-65; Zou B et al., 2015.) This agreement in fracture toughness measurement between the scratch test fracture approach and conventional fracture testing method for plain Portland cement supports the rigour and validity of this approach. FIGS. 10A-10D display the load-depth curves and fracture toughness scaling curves for all Portland cement specimens. The high-shear, high-speed mixing and the curing with an orbital shaker were found to significantly enhance fracture resistance, as the reference Portland cement R-HS-OS exhibited a 26% increase in fracture toughness, with a fracture toughness value of 0.67±0.02 MPa√m, consistent with the reduction of porosity due to the improved mixing/casting method.

FIGS. 5A-5D display fracture toughness values measured via scratch tests for all cement nanocomposites considered in this example. FIGS. 11A-11L display the fracture scaling curves, and Table 4 lists the fracture toughness values for all 12 cement nanocomposites. For graphene-reinforced cement, the fracture toughness ranged from 0.706 to 0.721 MPa√m. Moreover, a positive correlation was observed between the mass fraction of graphene nanoplatelets and the gain in fracture toughness. For carbon nanofiber-reinforced cement, the fracture toughness ranged from 0.666 to 0.733 MPa√m. For cement reinforced by multiwalled carbon nanotubes and helical carbon nanotubes, the fracture toughness ranged from 0.603 to 0.719 MPa√m and 0.618 to 0.731 MPa√m, respectively. Graphene nanoplatelets exhibited the highest specific surface area, 500-700 m²/g, which could explain the higher values of the fracture toughness as the mass fraction of graphene nanoplatelets increased. Similarly, carbon nanofibers exhibited the highest length, 50-200 µm, which could explain the enhancement in fracture toughness for all three reinforcement levels. Thus, this example demonstrates that the specific surface area and the length of nanomaterials play a significant role in regulating the fracture toughness of cement nanocomposites.

TABLE 4

Fracture toughness values, in MPam$^{0.5}$, measured for cement nanocomposites using scratch tests.

| Type of carbon-based nanomaterial | 0.1 wt. % | 0.2 wt. % | 0.5 wt. % |
|---|---|---|---|
| Graphene nanoplatelets | 0.706 ± 0.016 | 0.709 ± 0.038 | 0.721 ± 0.024 |
| Carbon nanofibers | 0.733 ± 0.028 | 0.666 ± 0.018 | 0.730 ± 0.032 |
| Helical carbon nanotubes | 0.618 ± 0.015 | 0.703 ± 0.043 | 0.731 ± 0.011 |
| Multiwalled carbon nanotubes | 0.620 ± 0.042 | 0.603 ± 0.018 | 0.719 ± 0.017 |

CNF = carbon nanofiber-reinforced cement.
X = CNT for multi-walled carbon nanotube-reinforced cement.
X = HX for helical carbon nanotube-reinforced cement.
X = GNP for graphene-reinforced cement.

DISCUSSION

Figure 6:
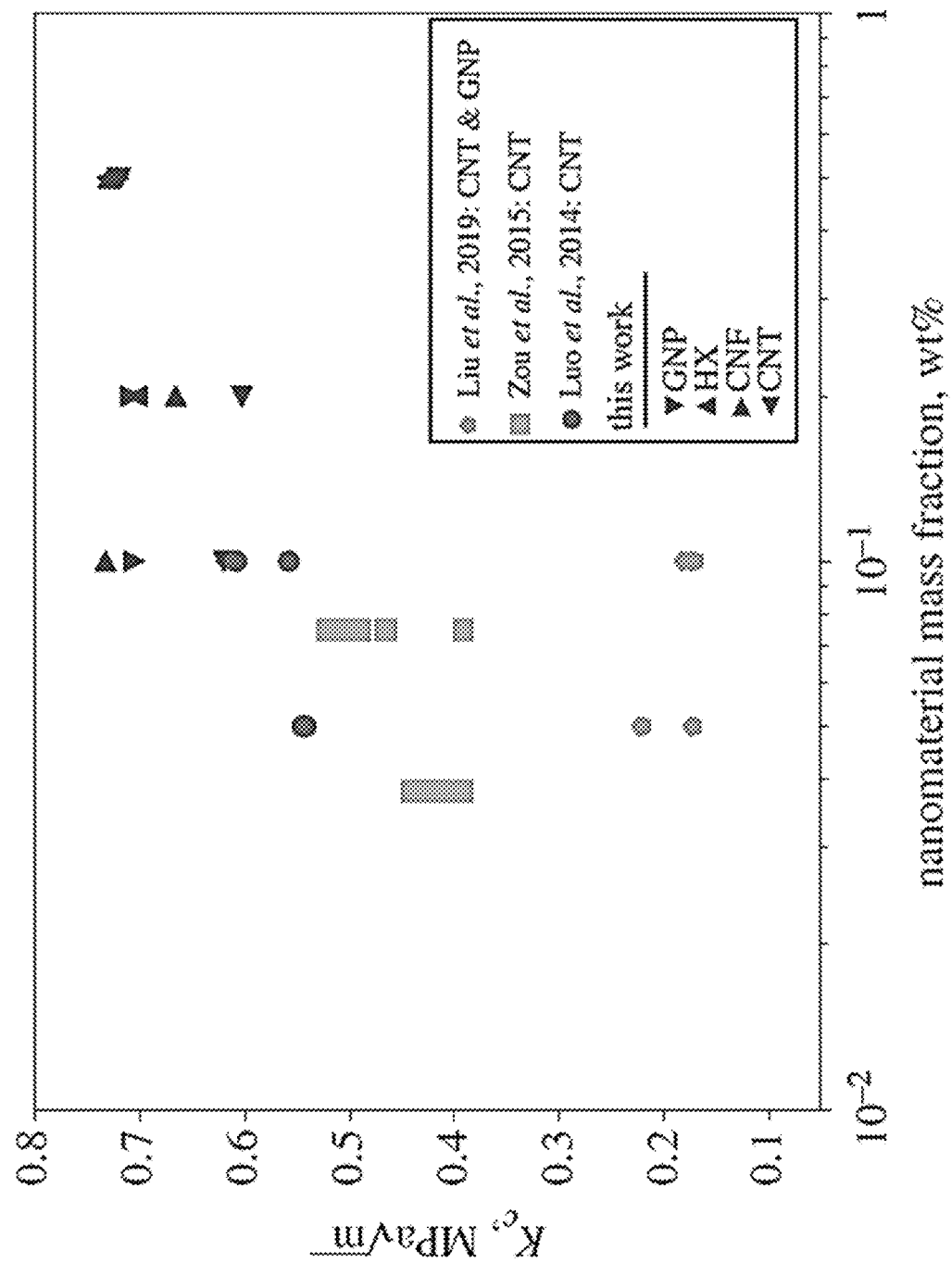
FIG. 6 shows a comparison of the findings in this example to recent works on cement reinforced with carbon-based nanomaterials. GNP=graphene nanoplatelets. CNF=carbon nanofibers. HX=helical carbon nanotubes. CNT=carbon nanotubes. (Liu J et al., Constr. Build. Mat. 2019 Mar. 10; 200:530-538; Zou B et al., Carbon. 2015 Apr. 1; 85:212-220; Hu, Yu, et al. "Fracture toughness enhancement of cement paste with multi-walled carbon nanotubes." *Construction and Building Materials* 70 (2014): 332-338.)

The novel synthesis route presented in this example yielded increases in the fracture toughness of cement nanocomposites. FIG. 6 compares these findings to recent studies that have measured the fracture toughness of Portland cement paste reinforced with carbon-based nanomaterials, such as carbon nanotubes and graphene nanoplatelets. Luo et al. measured the fracture toughness of CNT-reinforced cement using three-point bending tests on single-edge notched specimens. (Luo J L et al., Adv. Mat. Res. 2011; 146:581-584.) They reported fracture toughness values ranging from 0.1757 to 0.3242 MPa$\sqrt{m}$ for 0.1-0.2 wt. % CNT-reinforced cement after 28 days of curing. Hu et al. measured the fracture toughness of CNT with w/c=0.2 after 48 hours of curing. (Hu Y et al., Constr. and Build. Mat. 2014 Nov. 15; 70:332-338.) The fracture toughness was 0.542-0.608 MPa$\sqrt{m}$ for 0.05-0.1 wt. % CNT-reinforced cement. Zou et al. investigated the fracture resistance of CNT cement with w/c=0.4 at mass fractions 0.038% and 0.075% for various values of ultrasonic dispersion energy and after 28 days of curing. (Zou et al., 2015.) However, they concluded that the optimal dispersion energy was constant, irrespective of the CNT mass fraction. The fracture toughness values for the optimal mix design were 0.408 MPa$\sqrt{m}$ for 0.038% CNT and 0.506 MPa$\sqrt{m}$ for 0.075% CNT. Finally, Liu et al. studied the fracture behaviour of CNT cement and GNP cement with w/c=0.35 and mass fractions of 0.05 wt. % and 0.1 wt. % after 28 days of curing. (Liu J et al., 2019.) The fracture toughness was 0.180-0.221 MPa-07 for CNT cement and 0.171-0.172 MPa$\sqrt{m}$ for GNP cement. The fracture toughness decreased as the mass fraction of nanomaterials increased.

It is challenging to compare the fracture toughness of cement nanocomposites between studies due to differences in the type, geometry, and source of nanomaterials. One must also account for differences in cement nanocomposite w/c ratios, curing age, and curing regimes. Another factor is the length-scale of testing. For instance, macroscopic specimens might involve a higher distribution of defects that would result in lower fracture toughness. However, the methodology presented in this example yields both higher reinforcement levels and higher fracture toughness values for carbon nanotube-reinforced cement, carbon nanofiber-reinforced cement, and graphene-reinforced cement. After seven days of curing, for w/c=0.44, and for reinforcement mass fractions of 0.1-0.5 wt. %, the lowest fracture toughness value was 0.599 MPa$\sqrt{m}$ and the highest value was 0.726 MPa$\sqrt{m}$.

This example has demonstrated the potential of scratch testing to yield the fracture toughness of cement nanocomposites. The observed fracture-enhancing mechanisms were pore refinement, microcracking, crack deflection, ligament bridging, and debris formation. The advantage of the scratch test method is that it is semi-destructive, reproducible, and requires small specimens. The specimens tested in this study were 30 mm wide and 3 mm thick. In contrast, conventional fracture testing methods, such as the three-point bending test, require macroscopic specimens along with fastidious specimen preparation. Furthermore, it is essential to generate a sharp notch to yield an accurate fracture toughness measurement in the three-point bending method. In practice, a finite notch radius is used, which can result in significant measurement inaccuracies. Another issue is the presence of significant size effects due to the interaction between the fracture process zone and the specimen dimensions. The scratch test, on the other hand, does not require an initial notch to be created. Moreover, size-independent fracture toughness is obtained in the asymptotic regime of brittle fracture. Thus, the scratch test provides an alternative means to probe fracture toughness at the microscopic length-scale using depth-based sensing techniques.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can be only one or can mean "one or more." Embodiments of the inventions consistent with either construction are covered.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A cement composite comprising:
Portland cement; and
graphene nanoplatelets or helical carbon nanotubes, wherein:
the cement composite is free of chemical dispersing aids;
the cement composite has a fracture toughness of at least 0.65 MPa$\sqrt{m}$;
the cement composite has a total porosity of no greater than 8.5%; and
the cement composite has a water absorption of no greater than 4.5%.

2. The cement composite of claim 1, consisting of the Portland cement, the graphene nanoplatelets or the helical carbon nanotubes, and, optionally, adsorbed water.

3. The cement composite of claim 1, wherein the graphene nanoplatelets or the helical carbon nanotubes are free of dispersion-enhancing chemical surface functionalization.

4. The cement composite of claim 1, comprising the graphene nanoplatelets.

5. The cement composite of claim 4, having a concentration of graphene nanoplatelets in the range from 0.1 wt % to 0.5 wt. %, based on the weight of the Portland cement.

6. The cement composite of claim 5, having a fracture toughness in the range from 0.65 MPa√m to 0.75 MPa√m.

7. The cement composite of claim 6, having a total porosity in the range from 4.5% to 7.5% and a water absorption in the range from 2.0% to 4.0%.

8. The cement composite of claim 7, wherein the graphene nanoplatelets are free of dispersion-enhancing chemical surface functionalization.

9. The cement composite of claim 4, having a total porosity in the range from 4.5% to 7.5%.

10. The cement composite of claim 4, having a water absorption in the range from 2.0% to 4.0%.

11. The cement composite of claim 1, comprising the helical carbon nanotubes.

12. The cement composite of claim 11, having a concentration of helical carbon nanotubes in the range from 0.1 wt % to 0.5 wt. %, based on the weight of the Portland cement.

13. The cement composite of claim 12, having a fracture toughness in the range from 0.65 MPa√m to 0.75 Mpa√m.

14. The cement composite of claim 11, having a total porosity in the range from 6.8% to 8.5%.

15. The cement composite of claim 11, having a water absorption in the range from 3.5% to 4.5%.

16. The cement composite of claim 11, having a total porosity in the range from 6.8% to 8.5% and a water absorption in the range from 3.5% to 4.5%.

17. The cement composite of claim 16, wherein the helical carbon nanotubes are free of dispersion-enhancing chemical surface functionalization.

* * * * *